United States Patent
Ishizuka et al.

(10) Patent No.: US 6,850,015 B2
(45) Date of Patent: Feb. 1, 2005

(54) HIGH PRESSURE DISCHARGE LAMP STARTER DEVICE AND AN AUTOMOTIVE HEADLIGHT DEVICE

(75) Inventors: Akio Ishizuka, Yokohama (JP); Shigehisa Kawatsuru, Yokosuka (JP)

(73) Assignee: Harison Toshiba Lighting Corp., Imabari (JP)

( * ) Notice: Subject to any disclaimer, the term of this patent is extended or adjusted under 35 U.S.C. 154(b) by 0 days.

(21) Appl. No.: 10/633,426

(22) Filed: Aug. 1, 2003

(65) Prior Publication Data

US 2004/0090188 A1 May 13, 2004

Related U.S. Application Data

(63) Continuation of application No. PCT/JP02/08088, filed on Aug. 7, 2002.

(30) Foreign Application Priority Data

Aug. 29, 2001 (JP) ..................... 2001-259616
Feb. 28, 2002 (JP) ..................... 2002-054080

(51) Int. Cl.[7] .............................. H05B 37/02
(52) U.S. Cl. ............... 315/224; 315/82; 315/307
(58) Field of Search ............... 315/224, 307, 315/82, DIG. 7

(56) References Cited

U.S. PATENT DOCUMENTS

| | | | | |
|---|---|---|---|---|
| 5,677,602 A | * | 10/1997 | Paul et al. | 315/224 |
| 6,163,115 A | | 12/2000 | Ishizuka | 315/308 |
| 6,208,088 B1 | | 3/2001 | Konishi et al. | 315/291 |
| 6,384,544 B1 | * | 5/2002 | Greenwood et al. | 315/291 |

FOREIGN PATENT DOCUMENTS

| | | |
|---|---|---|
| EP | 0883160 | 12/1998 |
| JP | 4141988 | 5/1992 |
| JP | 4272696 | 9/1992 |
| JP | 4342993 | 11/1992 |
| JP | 5226083 | 9/1993 |
| JP | 7065973 | 3/1995 |
| JP | 8008087 | 1/1996 |
| JP | 8222381 | 8/1996 |
| JP | 8250287 | 9/1996 |
| JP | 2587718 | 12/1996 |
| JP | 9082480 | 3/1997 |
| JP | 9223590 | 8/1997 |
| JP | 10032096 | 2/1998 |
| JP | 11086795 | 3/1999 |
| JP | 11238488 | 8/1999 |

OTHER PUBLICATIONS

15th *Technical Meeting on Plasma Physics of Light Sources and its applications*, Illuminating Engineering Institute, Dec. 4, 2000, pp. 69–73.

* cited by examiner

*Primary Examiner*—David Vu
(74) *Attorney, Agent, or Firm*—John P. White; Cooper & Dunham LLP

(57) ABSTRACT

A high pressure discharge lamp starter device comprises a starter circuit OC and control element CC. The starter circuit OC is capable of starting up an essentially mercury free high-pressure discharge lamp HPL containing a rare gas and a metal halide. The control element CC controls the starter circuit OC to start up the high pressure discharge lamp HPL, supply a lamp power larger than twice a rated lamp power, reduce lamp power such that light output is not significantly larger compared to that during a stable light emission time and the light output does not rapidly increase, when a metal halide charged in the high pressure discharge lamp HPL is abruptly vaporized, thereafter, gradually reduce the lamp power so as to settle the rated lamp power.

11 Claims, 15 Drawing Sheets

HIGH PRESSURE DISCHARGE LAMP STARTER DEVICE AND AN AUTOMOTIVE HEADLIGHT DEVICE

CROSS-REFERENCE TO RELATED APPLICATIONS

This is a Continuation Application of PCT Application No. PCT/JP02/08088, filed Aug. 7, 2002, which was not published under PCT Article 21(2) in English.

This application is based upon and claims the benefit of priority from the prior Japanese Patent Applications No. 2001-259616, filed Aug. 29, 2001; and No. 2002-054080, filed Feb. 28, 2002, the entire contents of both of which are incorporated herein by reference.

BACKGROUND OF THE INVENTION

1. Field of the Invention

The present invention relates to a high pressure discharge lamp starter device for turning on an essentially mercury free high pressure discharge lamp and an automotive headlight device using the high pressure discharge lamp starter device.

2. Description of the Related Art

Japanese Patent Application KOKAI Publication No. 11-238488 (Prior Art 1) discloses an essentially mercury free metal halide discharge lamp charged with a discharge medium containing a first halide, which is a halide of a desired light-emitting metal, a second halide, which is a halide of a metal rarely emitting light in a visible range compared to the metal of the first halide, and a rare gas. The metal halide discharge lamp, even though it is virtually free from mercury of large environmental-burdening unlike a conventional metal halide discharge lamp, is excellent since the lamp voltage of the metal halide discharge lamp can be increased to supply a desired lamp power. In this respect, the high pressure discharge lamp is advantageous. Note that Japanese Patent Application KOKAI Publication No. 11-86795 discloses substantially the same technique as Prior Art 1 is disclosed.

Furthermore, a mercury-free automotive metal halide lamp containing an NaI—ScI$_3$ based metal halide plus InI is disclosed in the research material for the 15th conference on light-source physical characteristic application, page 69 to 73 (Prior Art 2) held on Dec. 4, 2000 (published by the Illuminating Engineering Institute).

On the other hand, in high pressure discharge lamps such as metal halide lamps used in automotive headlights, which requires not lower than a predetermined amount of light in a short time, a technique is known for reducing the light-amount rise time by supplying a lamp power larger than the rated lamp power during low-temperature startup time. Typically, in the beginning of the startup time, a lamp power of about 70 W is supplied to a lamp whose rated lamp power is 35 W. The lamp power is reduced with time or with an increase of the lamp voltage. Finally, the lamp power is settled at the rated lamp power. In this case of a conventional mercury-containing high pressure discharge lamp (hereinafter, referred to as a "mercury-containing lamp" for convenience sake), mercury having a low boiling point is first vaporized to emit light and then a halide of a light-emitting metal is vaporized as the lumen temperature increases, contributing to the initial light emission. For this reason, if light emitted from mercury is equal to or more than a predetermined amount in the beginning to the startup, a relatively long time can be given until the initial light-emission from a light emitting metal takes place. To explain more specifically, immediately after the startup, even if a large power of about 70 W is supplied to a lamp for light emission, the mercury vapor pressure is saturated in about two seconds. Thereafter, even if a lamp power less than 70 W is supplied, the same light amount as in the stable light-emission time can be expected. In short, it can be take several tens seconds from the initiation of vaporization of a halide of a light-emitting metal until the light emission from the light-emitting metal becomes predominant. Because of this, high pressure discharge lamps, even if they vary in shape, content of a light-emitting metal halide, and distribution of the halide attached to the lumen, can obtain relatively stable light-amount rise characteristics.

In contrast, in a high pressure discharge lamp containing no mercury (hereinafter, referred to as a "mercury-free lamp" for convenience sake), since light emission from mercury cannot be expected in the beginning of the startup, first a rare gas such as xenon emits light and then a light-emitting metal contained in the form of a halide initiates light emission.

However, in the mercury-free lamp, an extremely high temperature is required to vaporize a halide of the light-emitting metal compared to mercury. Because of this, to obtain the same light amount as in a mercury-containing lamp in the same time, a lamp power not less than 2.5 times as large as the rating lamp power must be supplied for further longer time than in the mercury-containing lamp. However, when such high lamp power is supplied, a metal halide contained in the lamp abruptly vaporizes, with the result that the light emission amount increases twice to thrice that of a stable light-emission under the supply of rated lamp power.

FIG. 1 is a graph showing change of lamp voltage (Vl), lamp current (Il) and output of light (L) during the startup time when a lamp power 2.5 times as large as rated lamp power is supplied to a mercury-free lamp. In the graph, the horizontal axis indicates time and the vertical axis indicates each of the magnitudes of V1, Il and L. The light emission L sharply increases in a certain region, which means that a metal halide abruptly vaporizes.

In a mercury-free lamp, when intensive vaporization of a metal halide takes place in the absence of any control as described above, a large amount of light significantly in excess of rated light is emitted. As a result, in the case of an automotive headlight device, the driver of an oncoming car will be strongly dazzled. This is extremely dangerous.

Furthermore, in a mercury-free lamp, since no light is emitted from mercury, even if the same lamp power is supplied, the variation of light-amount rise characteristics of high pressure discharge lamps becomes more apparent. Such variation in light-amount rise characteristics is ascribed to difference in shape of a high pressure discharge lamp, the content of a light-emitting metal halide, and the distribution state of the light-emitting metal halide attached to the lumen. Because of this, time from the startup until a metal halide abruptly vaporizes varies.

To deal with the aforementioned problems, it is considered that the supplied lamp power is manipulated to reduce at the same time the intensive vaporization of a metal halide takes place by predicting the initiation time of the intensive vaporization. However, if the lamp power supply is reduced before a metal halide starts intensive vaporization under the influence of variation in light amount rise characteristics, the light emission amount considerably decreased to a level lower than that of the stable light-emission time on the contrary to the above case. As a result, the illuminance given to a road surface becomes insufficient. This is also extremely dangerous.

BRIEF SUMMARY OF THE INVENTION

An object of the present invention is to provide a high pressure discharge lamp starter device capable of appropriately controlling intensive vaporization of a metal halide when a mercury-free lamp is lighted on to fall the light amount within an acceptable range, and also to provide an automotive headlight device using the high pressure discharge lamp starter device.

Another object of the present invention is to provide a high pressure discharge lamp starter device, which is rarely influenced by variation of light-amount rise characteristics of a mercury-free lamp, and also to provide an automotive headlight device using the high pressure discharge lamp starter device.

A high pressure discharge lamp starter device according to a first embodiment of the present invention comprises a starter circuit capable of starting up an essentially mercury free high pressure discharge lamp containing a rare gas and a metal halide; and control means which allows the starter circuit to start up the high pressure discharge lamp and to supply a larger lamp power twice a rated lamp power, and which controls the starter circuit to reduce the lamp power such that the light output is not significantly larger than that of a stable light-emission time and the light output does not rapidly increase, when a metal halide charged in the high pressure discharge lamp is abruptly vaporized, and thereafter gradually reduce the lamp power so as to settle at the rated lamp power.

In the first embodiment and the following embodiments of the present invention, the definitions and technical meanings of terms are the same as defined below, unless otherwise specified. In the first embodiment, the high pressure discharge lamp is not an essential structural element; however, the invention according to the first embodiment is based on the precondition that to an essentially mercury free high pressure discharge lamp is stably turned on. Accordingly, explanation will be started with the gist of the high pressure discharge lamp and goes to the features of the first embodiment.

<High Pressure Discharge Lamp>

(Discharge Medium)

The high pressure discharge lamp turned on in the first embodiment comprises a specific discharge medium. First of all, the medium is essentially free from mercury. In the first embodiment, the phrase "essentially free from mercury" means that mercury is not contained at all, however, less than 2 mg/cc, preferably not more than 1 mg/cc, of mercury may be present in an airtight chamber. However, it is desirable that no mercury be contained in the environmental point of view. In a conventional discharge lamp maintaining its electric characteristics by virtue of mercury vapor, 20 to 40 mg/cc of mercury, 50 mg/cc, in some cases, is actually contained in the airtight chamber for a short-arc type. Compared to such a conventional type, the aforementioned amount of mercury may be substantially low.

Next, a rare gas is charged. As the rare gas, xenon is preferably used. A rare gas is charged for the reason that it serves not only as a starting-up gas and accelerates the rise of the light amount immediately after the turning on the lamp but also as a buffer gas during a stable light-emission time. For these reasons, the rare gas is desirably charged at a high pressure, e.g., 5 to 15 atms. Within the range, it is possible to speed up the time of raising luminous flux to 4 seconds after the startup to give a luminous intensity of 8000 cd at a representative point of the front surface of an automotive headlight.

Furthermore, a metal halide is charged. The metal halide includes at least a halide of a light-emitting metal. Examples of the halide of a light-emitting metal are halides of sodium (Na), scandium (Sc), and rare earth metals such as dysprosium (Dy). Furthermore, halides of sodium (Na), scandium (Sc), and Indium (In) may be charged as the light-emitting metal halide.

Furthermore, a halide of another light emitting metal is contained as a second metal halide other than the aforementioned light-emitting metal halide. The second metal halide has a relatively high vapor pressure and relatively low light emission in the visible range.

As the second metal halide, one or a plurality of halides selected from the group consisting of metals such as magnesium (Mg), Iron (Fe), cobalt (Co), chromium (Cr), zinc (Zn), nickel (Ni), manganese (Mn), aluminium (Al), antimony (Sb), beryllium (Be), rhenium (Re), gallium (Ga), titanium (Ti), zirconium (Zr), and hafnium (Hf).

Since the high pressure discharge lamp to be used in the first embodiment contains the second metal halide in place of mercury conventionally used, as explained above, if the lamp is turned on by supplying a lamp power larger than twice rated lamp voltage, the second metal halide abruptly vaporizes after a while. At this time, if no specific control is performed, the light emission extremely and sharply increases.

(Other Structural Elements of the High Pressure Discharge Lamp).

In the high pressure discharge lamp of the first embodiment, the following structural elements are not requisite but if they are added to the lamp as needed, it will be effective particularly in an automotive headlight device.

1. Airtight Chamber

The airtight chamber has a discharge space formed therein. The discharge space of the airtight chamber is surrounded by a relatively thick wall made of a refractory and light-transmitting material such as quartz glass or light-transmitting ceramic. The discharge space is almost cylindrical and surrounded by the wall whose middle portion along the shaft is thicker than both ends.

2. Electrode

A pair of electrodes are arranged at both ends of the airtight chamber so as to face each other at a distance of preferably 6 mm or smaller. Furthermore, at the startup time, the lamp may be turned on by supplying direct current. When the pair of electrodes are used as anodes, even if a lamp power not smaller than twice a rated lamp power is supplied, the electrodes may become resistant against such a lamp power not smaller than twice the rated lamp power if a bulb portion having a larger diameter than the shaft portion is formed at the tip portion of the electrode.

3. Rated Lamp Power

The rated lamp power is generally 250 W or smaller, preferably 100 W or smaller, most preferably, 60 W or smaller. In the high pressure discharge lamp to be used in an automotive headlight, the rated lamp power is generally 80 W or smaller, preferably 60 W or smaller, and most preferably about 35 W or smaller.

<Starter Circuit>

The starter circuit refers to a means for supplying electric energy required for maintaining the light emission state to a high pressure discharge lamp while appropriately controlling the electric energy. The starter circuit is configured to not only change the lamp power to be supplied to the high pressure discharge lamp in accordance with the control performed by a control means but also limit the current so as to allow the high pressure discharge lamp to stably emit light. The high pressure discharge lamp may be turned on by supplying either direct current or alternating current. Alternatively, direct current may be supplied from the beginning to a predetermined time and thereafter alternating current may be supplied in place of the direct current. In either case, it is preferable that the starter circuit be electronically operated in consideration of easiness, accuracy and responsibility of the operation. The alternating voltage may have a rectangular wave. Furthermore, the high pressure discharge lamp may be configured such that the rate power is supplied during stable light emission time of the high pressure discharge lamp.

Next, the means for limiting the current of the high pressure discharge lamp must have an appropriate impedance depending upon the voltage to be applied to the high pressure discharge lamp. However, when a switching regulator is used to desirably control a direct current power supply voltage, an inductor serving as a structural element functions also as a current-limiting element by switching, it may be possible to omit a current-limiting element to be outwardly provided.

When alternating current (AC) is supplied to the high pressure discharge lamp, case must be taken with respect to the AC frequency such that the lamp does not cause acoustic resonance. When the high pressure discharge lamp has a relatively small discharge container as is used in an automotive headlight device, AC having a frequency not larger than about 2 kHz may be used without any practical problem.

Furthermore, in the starter circuit, the no-load output voltage can be set at about 200 to 600 V.

<Control Means>

The control means controls the lamp power to be supplied to the starter circuit as mentioned below. More specifically, the control means (1) controls the lamp power of the startup time, (2) controls the lamp power during the abrupt vaporization of a metal halide, and (3) controls the lamp power to settle at the rated lamp power in order to maintain stable light emission. Now, individual control operation will be described below. In addition, (4) a method of controlling the lamp power and (5) high-temperature startup will be explained.

(1) Control During Startup

The control during startup is the one performed during the startup time of a high pressure discharge lamp, as literally interpreted, more specifically, in the beginning of turning on the lamp. More specifically, the control is performed to facilitate the rise of light flux. For this purpose, it is preferable that an appropriate lamp power within the range larger than twice and smaller than thrice rated lamp power be supplied to a high pressure discharge lamp. More specifically, in the case of a rated lamp power of 35 W, a high pressure discharge lamp may preferably be turned on by supplying a lamp power within the range of about 76 to 110 W. At the startup time, discharge takes place mainly due to a rare gas and the gas pressure is almost constant or gradually increases. Accordingly, when the lamp is turned on by supplying a rated current, the lamp power to be supplied becomes almost constant. Furthermore, Because of the control of the startup time, the high pressure discharge lamp outputs about 50% of the light emission during the rated light-emission time due to the discharge of a rare gas. Note that the control during the startup time is generally performed for about 1 to 5 seconds, preferably about 2 to 4 seconds.

(2) Control During the Abrupt Vaporization of a Metal Halide

When a metal halide abruptly vaporizes, control is performed to decrease the lamp power such that light output is not significantly larger compared to that of the stable light emission time and such that the output of light does not rapidly increase when a metal halide abruptly vaporizes. However, if the timing of decreasing the lamp power is too early, in other words, if the lamp power is significantly decreased before a metal halide abruptly vaporizes, the light output greatly reduces than that of the stable light-emission time. For this reason, the timing and magnitude of the decrease can be properly determined. Note that the phrase "light output is not significantly larger compared to that of the stable light emission time" means that the output of light falls within the range not more than twice the light emission during the stable operation time.

More specifically, good control can be made by performing the decrease of the lamp power at an appropriate timing by detecting the abrupt vaporization of a metal halide and decreasing the lamp power to be supplied simultaneously upon the detection. In this manner, even if individual high pressure discharge lamps vary in characteristics, individual lamps may be controlled to desirably emit light without any influence from the variance in characteristics. In this control manner, the lamp power can be sufficiently decreased to a desired magnitude.

On the other hand, there is another good controlling method in which the lamp power is appropriately decreased. In this method, in consideration of the variance in characteristics of individual high pressure discharge lamps, a time range as narrow as possible but sufficiently including the timing at which a metal halide abruptly vaporizes, is previously set, and then, the lamp power supplied at the startup time is reduced at an appropriate reduction rate set up under sufficient consideration. As the reduction rate of the lamp power to be applied during this time period, an intermediate rate smaller than the reduction rate set in Stage (3) may be used. Note that the time range is generally about 0.4 to 4 seconds (about 1.4 to 10 seconds after the startup), preferably, about 1 to 2 seconds (about 3 to 6 seconds after the startup). Owning to this control, even if the lamp power is decreased slightly before a metal halide abruptly vaporizes, the light output does not extremely increase or decrease beyond a predetermined range and thus falls within an acceptable range.

The term "acceptable range" of the light output refers to the range of 50 to 200% of the light output during the stable light-emission time.

(3) Control for Settling Lamp Power at the Rated Lamp Power

Control for settling lamp power at the rated lamp power is performed in order to transfer light emission state to stable light emission state, in other words, stable light output state, in about one minute from the startup. The control during this time period can be flexibly modified depending upon the manner of control performed during the Stage (2) when a metal halide abruptly vaporizes.

More specifically, the time when a metal halide abruptly vaporizes is detected and the lamp power supplied at the detection time is decreased immediately upon the detection.

The lamp power is reduced to the rated lamp power in accordance with a continuous reduction rate.

In contrast, the control at the time a metal halide abruptly vaporizes is performed by decreasing the lamp power at an appropriate timing, the lamp power may be reduced starting at a larger reduction rate than that performed in Stage (2) while decreasing the reduction rate gradually.

Note that the phrase "in about one minute from the startup" refers to the range from 40 to 70 seconds after the startup. Furthermore, in the control operations of Stages (2) and (3) mentioned above, the lamp power to be supplied can be reduced either continuously or stepwise.

(4) Method of Controlling Lamp Power

The lamp power can be controlled by changing reference power, that is, the rated lamp power, in a feedback manner. Note that, in the case of the high pressure discharge lamp according to the first embodiment, since the lamp voltage is determined by the vapor pressure of a metal halide, the rated lamp power can be controlled by controlling the rated lamp current.

(5) High-temperature Startup

The first embodiment provides a means for solving a problem associated with lamp power control during low temperature-startup, as explained above. To startup a high pressure discharge lamp at high temperature, any manner may be used; however, preferably, the following manner may be employed.

The term "high-temperature startup" means that startup is performed at a temperature higher than room temperature, for example, a temperature close to a temperature at which a high pressure discharge lamp is stably operated. Accordingly, a so-called "hot restart" corresponds to the high temperature startup.

More specifically, during the high-temperature startup, a lamp power close to at the rated lamp power is supplied. The phrase "close to at the rated lamp power" refers to a lamp power within the range of 105 to 150% of the rated lamp power, more preferably, ranging from 120 to 140%.

Note that the low temperature startup is distinguished from the high temperature startup based on the temperature of the high pressure discharge lamp, and the magnitude of the lamp current during the non light emission time, which is the passage of time after the lamp is turned off, or during the light emission time.

Furthermore, the control of the lamp power to be supplied to a high pressure discharge lamp can be readily performed by, for example, changing the voltage to be applied to the high pressure discharge lamp. If necessary, the lamp power to be supplied can be controlled continuously depending upon the non light-emission time of the high pressure discharge lamp.

Furthermore, it is possible to previously determine what amount of lamp power is to be supplied to a high pressure discharge lamp during the high temperature startup time, based on a preliminary experiment or simulation. The relationship between lamp power and temperature (whether the temperature is low or high) is previously stored in a memory in the form of table data and necessary data is read out from the memory based on calculation, thereby automatically controlling the starter circuit.

<Other Structure>

If desired, an igniter may be added. In the present invention, even if the pulse output voltage of the igniter needs to be larger, to some degree, than the voltage of a mercury-containing high pressure discharge lamp, the addition of the igniter will not make the achievement of the present invention difficult in view of cost, size, and weight.

<Function of First Embodiment>

In the first embodiment, an essentially mercury free high pressure discharge lamp containing a rare gas and a metal halide is started up at a low temperature not higher than room temperature. Immediately after the startup, the lamp power larger than twice the rated lamp power is supplied to the lamp. When the metal halide abruptly vaporizes, the lamp power is decreased such that the light output does not increase to a level significantly larger than that of the stable light-emission time and the output does not rapidly increase. Accordingly, even if the metal halide abruptly vaporizes, the amount of light will not be far larger or smaller than the rated light amount. Therefore, the driver of an oncoming car will not be strongly dazzled and the illuminance of a road surface will not be significantly lowered.

After a metal halide abruptly vaporizes, the lamp power is gradually reduced so as to settle at the rated lamp power. Therefore, the light emission smoothly goes to a stable state. With this mechanism, the illumination of the road surface can be safely performed from the startup to the stable light-emission time.

As explained in the foregoing, in the first embodiment, an essentially mercury free high pressure discharge lamp is used. Therefore, the lamp is free from a problem of environmental burden and capable of quickly raising luminous flux. Therefore, if the lamp is applied to automotive headlight devices, it can fully satisfy the specification of the automotive headlights.

However, application of the first embodiment is not limited to automotive headlights. The first embodiment may be applied to various uses.

A high pressure discharge lamp starter device according to a second embodiment of the present invention comprises a starter circuit capable of starting up an essentially mercury free high pressure discharge lamp containing a rare gas and a metal halide; and control means which controls the starter circuit to supply lamp power to the high pressure discharge lamp in such a manner that a first lamp power larger than twice a rated lamp power is supplied during a first time zone, a second lamp power is supplied during a second time zone, the second lamp power being reduced at a reduction rate of 1 to 8 W/second from the first lamp power, and a third lamp power is supplied during a third time zone, the third lamp power being gradually reduced from the second lamp power to the rated lamp power, where the first time zone is defined as the time of 1 to 20 seconds immediately after the startup of the high pressure discharge lamp;

the second time zone is defined as the time set within 0.4 to 9 seconds following the first time zone; and the third time zone is defined as the time following the second time zone and within 40 to 70 seconds immediately after the startup.

According to the second embodiment, there is provided a high pressure discharge lamp starter device capable of being equally controlled in consideration of variation in vaporization characteristics of a metal halide contained in an essentially mercury free high pressure discharge lamp, even if it has the variation. In addition, the high pressure discharge lamp starter device is capable of smoothly raising luminous flux toward the rated light amount. Therefore, illumination of the road surface can be performed safely. To explain more specifically, the control pattern is divided into the following three steps to protect the lamp from the effect of the abrupt vaporization of a metal halide and to allow the high pressure discharge lamp to successfully move to a stable illumination state within 40 to 70 seconds after the startup.

In the first pattern, the first lamp power is supplied to the lamp in the first time zone, which is set within the range of 1 to 20 seconds immediately after the startup, preferably, 2 to 4 seconds. The first lamp power, which is larger than twice the rated lamp power and preferably lower than thrice the rated lamp power, is supplied from the starter circuit to the high pressure discharge lamp. As a result, in the first time zone, mainly a rare gas is discharged to obtain almost a constant amount of light emission, which is about 50% of the light emission during the stable time.

In the second pattern, the second lamp power is supplied to the lamp in the second time zone, which is continued from the first time zone, and preferably 1 to 2 seconds. The second time zone is set within the range of 0.4 to 9 seconds. The second time zone includes the time during which a metal halide abruptly vaporizes. The time zone is set in consideration of variations between high pressure discharge lamps. The second lamp power is gradually reduced from the first lamp power at a reduction rate of 1 to 8 W/second. As a result, in the second time zone, the light output gradually increases toward the rated light amount even if abruptly vaporization of a metal halide takes place or increases toward the rated light amount through overshoot to some extent.

In the third pattern, the third lamp power is supplied to the lamp in the third time zone continued from the second time zone. The third time zone is set within 40 to 70 seconds immediately after the startup. This time zone is one during which light is output while suppressing the abrupt vaporization of a metal halide, and thereafter, the supplied lamp power is stabilized toward the rated lamp power. To make the supplied lamp power gradually closer to the rated lamp power, the supplied lamp power may be reduced at a reduction rate of larger than 8 W/second, which is larger than the uppermost reduction rate of the second lamp power, if necessary. As a result, by the end of the third time zone from immediately after the startup, the rated lamp power comes to be supplied and the rated light amount is output.

In the second embodiment, it is possible to obtain a high pressure discharge lamp starter device capable of stably increasing luminous flux from the startup toward the rated light amount by constant circuit operation even if a metal halide selected from the range considered suitable for a high pressure discharge lamp has different vaporization characteristics.

A high pressure discharge lamp starter device of a third embodiment of the present invention according to that of the second embodiment, in which the control means comprises a target lamp power setup circuit which previously stores
the first target lamp power, which is larger than twice the rated lamp power of the high pressure discharge lamp, to be supplied in the first time zone, the second target lamp power, which is reduced at a reduction rate of 1 to 8 W/second with the passage of time from the first target lamp power, to be supplied in the second time zone, and the third target lamp power, which is gradually reduced from the second target lamp power to the rated lamp power, to be supplied in the third time zone;

a light-emission time measuring timer which measures the light-emission time of the high pressure discharge lamp and outputs a target lamp power from the target lamp power setting circuit in accordance with the light-emission time;

actual lamp power detection means which detects an actual lamp power supplied to the high pressure discharge lamp; and lamp power regulation means which compares the target lamp power with the actual lamp power and regulates the actual lamp power in accordance with the difference between the target lamp power and the actual lamp power.

In the third embodiment, a preferable circuit arrangement suitable for carrying out the second embodiment is defined. To be more specific, the relationship between the first to third time zones and input lamp powers to be supplied in individual time zones is previously stored in the target lamp power setup circuit in the form of table data. Furthermore, the passage of time immediately after the startup is measured by the light-emission time measuring timer. With this arrangement, by outputting data of the light-emission time measuring timer to the target lamp power setup circuit, the target lamp power can be output from the target lamp power setup circuit depending upon the passage of time from immediately after the startup.

On the other hand, the lamp power actually supplied to a high pressure discharge lamp can be detected by the actual lamp power detection means. The actual lamp power detection means detects lamp voltage by the lamp voltage detection means and detects lamp current by the lamp current detection means, separately, and then, multiplies both detection values by use of a multiplication circuit. In this manner, the actual lamp power can be detected. Alternatively, the detection of the lamp voltage and the lamp current may be performed by detecting electric signals substantially in proportional to them. For example, when the starter circuit which supplies alternating current lamp power to a high pressure discharge lamp by use of a chopper circuit and a DC-AC converter circuit for converting the direct current output from the chopper circuit to an alternating current, the output voltage and the output current may be detected. This is because the output voltage from the chopper circuit is proportional to the lamp voltage and the output current from the chopper circuit is proportional to the lamp current. When the target lamp power read from the target lamp power setup circuit is divided by the lamp voltage, a target current can be arithmetically obtained. In this case, an actual lamp current may be detected in place of the actual lamp power.

Next, the lamp power regulation means, which compares the target lamp power with an actual lamp power and regulates the actual lamp power, is the one for supplying the lamp power equal to the target lamp power to a high pressure discharge lamp in a feedback manner. To perform this function without fail, a differential amplifier may be used. To explain more specifically, if the target lamp power or a value in proportional to the target lamp power is input to one of the input ends of the differential amplifier, and an actual lamp power or an value in proportional to the actual lamp power is input to the other input end, the difference between them is output. Based on the output of the difference, the lamp power output from the starter circuit may be changed in the direction of canceling out the difference. For example, when the chopper circuit and the DC-AC converter circuit are used, the chopper may be controlled by a pulse-width modulation (PWN) to change the output of the starter circuit.

In the third embodiment, it is possible to obtain a high pressure discharge lamp starter device having a relatively simple circuit arrangement and controlling the lamp power accurately and quickly in each time zone, thereby executing stable and proper illumination.

A high pressure discharge lamp starter device of a fourth embodiment of the present invention is substantially the same as in the third embodiment, except that the control means comprises turn-on detection means which detects turn-on of the high pressure discharge lamp and initiates the emission time measuring timer to measure emission time when the turn-on is detected.

The fourth embodiment defines the feature that the turn-on detection means detects the turn-on of the high pressure discharge lamp, and, on the basis of the detection, the light-emission time measuring timer initiates the measurement of light-emission time. The turn-on detection means for detecting the turn-on of the high pressure discharge lamp is not particularly limited. For example, the turn-on detection means may detect light-emission from the high pressure discharge lamp or heat generation accompanied with the light-emission. Alternatively, the turn-on detection means may detect the turn on of the lamp by detecting a change of electric signal of an electric circuit. For example, turn-on may be detected by detecting a lamp voltage or a voltage in proportional to the lamp voltage and lamp current or the current in proportional to the lamp current.

Furthermore, the light-emission time measuring timer is configured to initiate the function of the timer by detecting the turn-on by the turn-on detection means.

In the fourth embodiment, after a high pressure discharge lamp is actually turned on, the light-emission time measuring timer starts the function. Therefore, light-emission time can be accurately measured, with the result that the lamp power can be accurately controlled.

A high pressure discharge lamp starter device of a fifth embodiment is substantially the same as in the first embodiment except that the control means comprises a target lamp power setup circuit configured to store a first target lamp power, which is to be supplied in a first time zone and which is larger than twice a rated lamp power of the high pressure discharge lamp, and store a second target lamp power, which is to be supplied in a second time zone, and which is gradually reduced from the first target lamp power with the passage of time, where the first time zone is defined from the startup to the time at which a metal halide charged in the high pressure discharge lamp abruptly vaporizes, and the second time zone is defined as the one continued from the first time zone and set within the range of 40 to 70 seconds immediately after the startup;

a light-emission time measuring timer which measures the time from the startup to turn-on of the high pressure discharge lamp;

halide abrupt vaporization detection means which detects the time at which the metal halide charged in the high pressure discharge lamp abruptly vaporizes after the startup; and turn-on detection means which detects the turn-on of the high pressure discharge lamp.

In this case, the light emission time measuring timer works in concert with turn-on detection means and the halide abrupt vaporization detection means to allow the target lamp power setup circuit to output the first target lamp power when the turn-on detection means detects the turn-on of the high pressure discharge lamp;

to output the second target lamp power by switching the time zone to the second time zone, when the halide abrupt vaporization detection means detects the abrupt vaporization of a metal halide, and thereafter; and to output target lamp power depending upon light emission time.

In the fifth embodiment, a suitable circuit arrangement is defined for carrying out according to the first embodiment. More specifically, the circuit is arranged so as to detect the abrupt vaporization of a metal halide charged in a high pressure discharge lamp by use of the halide abrupt vaporization detection means. A means for detecting the abrupt vaporization of a metal halide is not particularly limited. When the abrupt vaporization of a metal halide takes place, an internal pressure increases. As a result, lamp voltage increases and lamp power increases and simultaneously the light output increases momentarily. For this reason, if a change of any one of the lamp voltage, lamp power, and the light output is detected, the abrupt vaporization of a metal halide can be detected.

In the fifth embodiment, the lamp power is controlled by dividing the time zone into the first and second time zones. In the first time zone, a first target lamp power is assigned and in the second time zone, a second target lamp power is assigned. The first time zone is defined as the time period before the abrupt vaporization of a metal halide takes place. The second time zone is defined from the time at which the abrupt vaporization of a metal halide takes place until the time at which light emission is stabilized. The borderline between both time zones varies depending upon the variance of the characteristics of the high pressure discharge lamp. Therefore, the time zone borderline is determined based on the detection performed by the halide abrupt vaporization detection means.

Furthermore, the first and second target lamp powers are previously stored in the target lamp power setup circuit. In the fifth embodiment, the second target lamp power may be reduced at a reduction rate sufficiently large to suppress the increase of the light output derived from the abrupt vaporization of a metal halide.

Furthermore, the light-emission time measuring timer is controlled by the turn-on detection means and the halide abrupt vaporization detection means. To explain more specifically, in the first time zone, the first target lamp power is output from the target lamp power setup circuit under control of the turn-on detection means. In contrast, in the second time zone, the time at which a metal halide abruptly vaporizes is detected by the halide abrupt vaporization detection means. Upon detection, the light emission time is switched to the second time zone. When the time zone is switched to the second time zone, the second target lamp power is output from the target lamp power setup circuit. As a result, the starter circuit outputs the second target lamp power, which gradually reduces under control of the control means. It follows that the light output from high pressure discharge lamp is reduced and settled at the rated light output. The emission light becomes stable.

In the fifth embodiment, the circuit arrangement is relatively simple. Since the control pattern can be simplified, the lamp power can be accurately controlled without fail.

A high pressure discharge lamp starter device of a sixth embodiment of the present invention is substantially the same as the fifth embodiment except that the halide abrupt vaporization detection means detects the abrupt vaporization of a halide by monitoring at least the voltage corresponding to the lamp voltage of the high pressure discharge lamp.

The sixth embodiment defines the arrangement suitable for electrically detecting the abrupt vaporization of a halide. More specifically, the abrupt vaporization of a metal halide within a high pressure discharge lamp accompanies an increase of lamp voltage, which can be detected directly or indirectly by monitoring the voltage corresponding to the lamp voltage. However, the lamp voltage in the first time zone immediately after the startup of a high pressure discharge lamp is varied depending on individual lamps, that is, distributed between 25 to 30V. The absolute values of lamp voltages are not always constant. Accordingly, in the first time zone, it is preferable that that abrupt vaporization of a halide be determined to take place if the lamp voltage increases relatively by about 1 to 3V in an appropriate time range between 0.4 to 0.6 seconds after the startup. Note that a metal halide is scattered in the period of 0.3 seconds from the startup by the effect of rush current at the startup time. Since the lamp voltage during this period is unstable, change of the lamp voltage may be desirably detected as soon as possible after such an unstable period.

Furthermore, in the sixth embodiment, the target to be detected is not limited to lamp voltage or the voltage corresponding to the lamp voltage. If necessary, the abrupt vaporization of a metal halide may be detected by the correlation between other electrical variables. For example, lamp current tends to reduce along with the abrupt vaporization of a metal halide. Therefore, the abrupt vaporization of a metal halide may be determined to take place at the time at which increase of lamp voltage or the voltage corresponding to the lamp voltage is observed simultaneously with decrease of lamp current or the current corresponding to the lamp current. In this manner, the accuracy and reliability of the detection can be further improved.

Furthermore, when the lamp is restarted, the maximum power must be supplied for a short time and immediately after, lamp power must be reduced. For this reason, the lamp voltage after the re-startup must be detected as soon as possible. However, the time from the re-startup to the stabilization of light emission varies depending upon the lamps (due to variation between high pressure discharge lamps and variation of light emission time). To set up optimum conditions, it is preferable to perform experiment in which re-startup is repeatedly performed by using a number of lamps.

In the sixth embodiment, the abrupt vaporization of a metal halide can be electrically detected by a relatively simple circuit arrangement.

A high pressure discharge lamp starter device according to a seventh embodiment of the present invention, comprises a starter circuit capable of starting up an essentially mercury free high pressure discharge lamp containing a rare gas and a metal halide; and control means which allows the starter circuit to start up the high pressure discharge lamp and supply a lamp power larger than twice a rated lamp power which determines as to whether the lamp power should be gradually reduced or not; and which controls the starter circuit to gradually decrease the lamp power so as to settle the rated lamp power while almost continuously increasing lamp voltage.

In the seventh embodiment, since the light amount rise characteristics of the high pressure discharge lamps vary, the period of time (hereinafter, referred to as "reduction time" for convenience sake) during which lamp power is gradually reduced to the rated lamp power after a large lamp power is supplied to the lamp immediately after the startup, varies depending upon individual high pressure discharge lamps. The seventh invention has been made by paying attention to the variation of the time period. To explain more specifically, if the reduction time is set up too early, the light amount temporarily reduces during the process of decreasing the lamp power, with the result that the rise of the light amount is delayed. If the amount of light decreases significantly, it will cause a security problem if the starter device is used in an automotive headlight. Conversely, if the reduction time is set up too late, the light amount rapidly increases, with the result that the lamp power reaches twice to thrice the rated lamp power, as described above.

In the seventh embodiment, determination is made whether or not the lamp power should be gradually reduced. The frequency of the determination and detection means are not particularly limited. More specifically, the determination can be made every single step or every two or more steps in which the lamp power is reduced. While the lamp power is continuously reduced, the determination may be carried out intermittently. Note that the period of determination may be set at an appropriate value within the range of 0.01 to 0.5 seconds, preferably 0.1 to 0.2 seconds. In this case, the determination is repeatedly performed. If determination is made that reduction should not be made, the lamp power is maintained constant. The determination can be made by determining change in lamp voltage, light amount, and so forth, when the lamp power is reduced. The determination is preferably performed by measuring the light amount of the lamp, because the change of the light amount can be directly monitored. However, even if the determination is made by measuring change of electric voltage, the light amount of the lamp can be indirectly measured based on the correlation between the light amount and the lamp voltage previously obtained. If the lamp voltage decreases or levels off, it is determined that the lamp power should not be reduced.

It is not necessary to perform the aforementioned determination until the light emission from the lamp is settled stable. The determination may be performed in the period during which the lamp power reduces at a high reduction rate. If necessary, the determination may be performed in the period during which the light emission is settled at a stable state. Furthermore, the phrase "almost continuously increasing lamp voltage" means that an average lamp voltage increases continuously. Therefore, the lamp voltage may be increased or decreased in a short period of time.

Next, the decrease of lamp power will be described. When the determination is made that the lamp power should be reduced, the lamp power to be supplied to the high pressure discharge lamp is reduced by controlling the starter circuit. More specifically, the lamp power is gradually reduced toward the rated lamp power without reducing the light amount even temporarily. The lamp power may be reduced either stepwise or continuously. Note that the lamp power may be controlled by any circuit means. For example, an actual lamp power arithmetic means and a target lamp power arithmetic means are arranged in the circuit. Control is performed by comparing the outputs from both means and making the actual lamp power equal to the target lamp power. Alternatively, the target lamp power arithmetic means, division means, actual lamp voltage detection means, and actual lamp current detection means are arrange in a circuit. The target lamp power obtained from the target lamp power arithmetic means is divided by the actual lamp voltage by means of the division means, thereby obtaining a target lamp current. Alternatively, control may be made by comparing the actual lamp current with the target lamp current and making the actual lamp current equal to the target lamp current.

In the seventh embodiment, the lamp power is reduced after the determination as to whether the lamp power is reduced or not. Therefore, even if the high pressure discharge lamp differs in light amount rise characteristics, the lamp power is reduced while the lamp voltage is continuously increased and settled at the rated lamp power. As a result, the light amount rises early. If such a device is applied to uses such as an automotive headlight, secure illumination can be made.

A high pressure discharge lamp starter device according to an eighth embodiment is characterized by comprising a starter circuit capable of starting up an essentially mercury free high pressure discharge lamp containing a rare gas and a metal halide;

control means which controls the starter circuit to start up the high pressure discharge lamp;

to supply a lamp power larger than twice a rated lamp power from the starter circuit;

to determine as to whether the lamp power should be reduced or not based on the light emission state of the high pressure discharge lamp when the lamp power is reduced in the state that the light amount of the high pressure discharge lamp is smaller than that during the stable light emission time; and to gradually reduce the lamp power so as to settle at the rated lamp power when it is determined that the lamp power should be decreased, or increase and return the lamp power to the level before the lamp power is reduced, when it is determined that the lamp power should not be reduced.

The eighth embodiment defines a suitable arrangement for continuously determining whether the lamp power should be reduced or not. After the high pressure discharge lamp is started up by application of startup pulse voltage after power supply is turned on, the light amount increases momentarily in pulse form in the beginning, and immediately after, the light amount reduces. Thereafter, the light amount increases along with time and then settles at the rated light amount. In most cases, the light amount is the lowest in about one second after the startup. In the eighth embodiment, the determination as to whether the lamp power should be reduced or not is started from the stage where light amount is still small. The phrase "the step where light amount is still small" may be up to about 4 seconds after the startup. In short, the determination may be started before the stage where light amount is still small as long as the stage where light amount is still small is included in the determination period.

When lamp power is reduced, determination is made whether or not the lamp power should be reduced. When the determination is made that reduction should not be made, the lamp power is returned to the state before the lamp power is reduced. In this manner, the lamp power is substantially not reduced. Since the reduction of the lamp power is repeatedly performed at predetermined time intervals, the determination is made every time the lamp power is reduced. Accordingly, even if the high pressure discharge lamp differs in light amount rise characteristics, the lamp power is reduced while the light amount increases and settles at the rated lamp power after a while.

The reduction of the lamp power may be performed either stepwise or continuously. The determination can be made at appropriate time intervals. It is desirable that the lamp power be changed as smooth as possible and that the determination be performed as frequently as possible. Therefore, the determination is preferably performed at the intervals of 0.01 to 0.5 seconds, more preferably, 0.1 to 0.2 seconds.

The determination can be made by measuring change of the lamp voltage or light amount of a high pressure discharge lamp, as mentioned above. More specifically, the measurement values before and after the reduction are compared to obtain the difference between the measurement values. The determination can be made based on the difference. The determination is terminated in the same manner as in the seventh embodiment.

In the eighth embodiment, lamp power is reduced in accordance with the light-amount rise characteristics of a high pressure discharge lamp. While the light amount is allowed to increase until at least 40 seconds after the startup, the lamp power can be smoothly reduced and settled at the rated lamp power. As a result, the light amount is accelerated to rise.

A high pressure discharge lamp starter device of a ninth embodiment of the present invention is substantially the same as the eighth embodiment except that the determination as to whether the lamp power should be reduced or not is made based on an increase or decrease of lamp voltage.

The ninth embodiment defines a suitable means for determining as to whether the lamp power should be reduced or not. The determination can be made simply and easily based on lamp voltage compared to the light amount. Increase or decrease of lamp voltage may be easily measured by comparing the lamp voltage before and after lamp power is reduced. For example, the lamp voltage data before the lamp power is reduced is stored in a memory means. The lamp voltage is then measured after the lamp power is reduced and compared to the stored lamp voltage read out from the memory means. If the starter circuit is controlled digitally by a personal computer, fine control can be easily performed. At that time, data-write and read-out of data can be performed by use of the memory of the personal computer.

The present inventors experimentally found that there is an apparent correlation between light amount and lamp voltage of the mercury-free lamp. The ninth embodiment is performed based on this finding. Now, referring to FIGS. 2 to 7, the variance of light amount rise characteristics of the mercury-free lamp and the aforementioned correlation will be explained below.

FIGS. 2 to 7 show change of light amount and lamp voltage with light-emission time with respect to three mercury-free lamps different in light amount rise characteristics when the lamps are turned on by high pressure discharge lamp starter devices equal in output characteristics. FIG. 2 is a graph with respect to a first mercury-free lamp and a gist portion of the graph is enlarged in FIG. 3. FIG. 4 is a graph with respect to a second mercury-free lamp and a gist portion of the graph is enlarged in FIG. 5. FIG. 6 is a graph with respect to a third mercury-free lamp. In each graph, the horizontal axis indicates light-emission time (second) and the vertical axis indicates a relative value of light amount and lamp voltage. Curve R and Curve V show light amount and lamp voltage, respectively. These mercury free lamps are manufactured almost simultaneously in the same manufacturing process and have the structure shown in FIG. 9. The details of the structure will be described later. The rated lamp power is 35 W. The rated lamp voltage is about 31V in the beginning of the startup. There is a difference of about ±3V between lamps.

FIG. 7 shows target lamp power characteristics set for the high pressure discharge lamp starter device used in turning on the first to third mercury-free lamps. In the graph, the horizontal axis and the vertical axis indicate time (second) and output power (W), respectively. More specifically, a constant first target lamp power, which is 2.5 times larger than the rated lamp power, is supplied in the first time zone from the startup to 5.5 seconds. A second target lamp power, which is to be reduced at a reduction rate of 2.3 W/second, is supplied in the second time zone of 1.5 seconds up to about 7 seconds. Thereafter, a third lamp power, which is gradually reduced from the second target lamp power to the rated lamp power, is supplied in the third time zone until the lamp emits light at the rated lamp power. More specifically, in FIG. 7, a target value of the lamp power to be supplied to a high pressure discharge lamp is programmed. As is apparent from the figure, the reduction rate of the lamp power in the third zone is high in the beginning and gradually reduces with time.

In the first mercury-free lamp shown in FIGS. 2 and 3, light amount rises moderately. In the third time zone starting from about 7 seconds, successive reduction of the lamp power toward the rated lamp power is initiated. In the time zone after the startup to 10 seconds, the light amount is moderately increases in average.

In contrast, in the second mercury-free lamp as shown in FIGS. 4 and 5, the light amount rises slowly. The successive reduction of lamp power is initiated toward the rated lamp power when the third time zone is started. The light amount temporarily reduces in the time zone from the startup to 10 seconds and thereafter increases. The lamp voltage almost levels off in this period during which the light amount is low.

Furthermore, in the third mercury-free lamp, as shown in FIG. 6, the light amount abruptly increases from about 2 seconds from the startup, and continuously increases during the second time zone. When the third time zone started, the light amount, for the first time, starts decreasing. Accordingly, since the mercury-free lamp emits extremely bright light until 7 seconds from the startup, the driver of an oncoming car will be dazzled if it is used as an automotive headlight. Even in this case, the lamp voltage increases in the beginning of the third time zone.

As is understand from the explanation above, if the lamp power is reduced based on the determination as to whether the lamp power to be supplied to a high pressure discharge lamp should be reduced or not depending upon the increase or decrease of the lamp voltage, the lamp power can be smoothly reduced to the rated lamp power without reducing or abruptly increasing the light amount.

Note that when the control is made based upon absolute value of the lamp voltage, the following problems are accompanied. The lamp voltage changes to 2 to 3V since light-amount starts increase and reaches the amount of stable emission time. As described above, an individual difference is ±3V. For example, on the precondition that reduction of the lamp power is started when the lamp voltage exceeds 34V, if the initial lamp voltage of the mercury free lamp is 28V, the reduction of the lamp voltage is not initiated unless an increase of the lamp voltage reaches 6V. However, when the lamp voltage reaches 34V, already excessive power supply state is produced.

In the ninth embodiment, determination is made based on the increase or decrease of lamp voltage. Therefore, even if the light amount rise characteristics of the mercury free lamp vary depending upon lamps, a proper determination can be made. Furthermore, the determination can be made by a simple structure and at a relatively low cost.

A high pressure discharge lamp starter device of a tenth embodiment according to any one of the first to ninth embodiments, further comprises an essentially mercury free high pressure discharge lamp containing a rare gas and a metal halide.

The tenth embodiment comprises an essentially mercury free high pressure discharge lamp, starter circuit and the control means.

An automotive headlight device according to an eleventh embodiment comprises an automotive headlight device main body and the high pressure discharge lamp starter device according to the tenth embodiment arranged in the automotive headlight device main body.

The term "automotive headlight device main body" is the remaining part of the automotive headlight device from which the high pressure discharge lamp starter device is eliminated.

Since the eleventh embodiment comprises a mercury-free high pressure discharge lamp and a high pressure discharge lamp starter device according to any one of the first to ninth embodiments, light flux rises quickly even though mercury giving large environmental load is not charged. In addition, the automotive headlight device having a high pressure discharge lamp with a long life expectancy can be obtained.

DETAILED DESCRIPTION OF THE INVENTION

Now, embodiments of the present invention will be explained with reference to the drawings.

Figure 8:
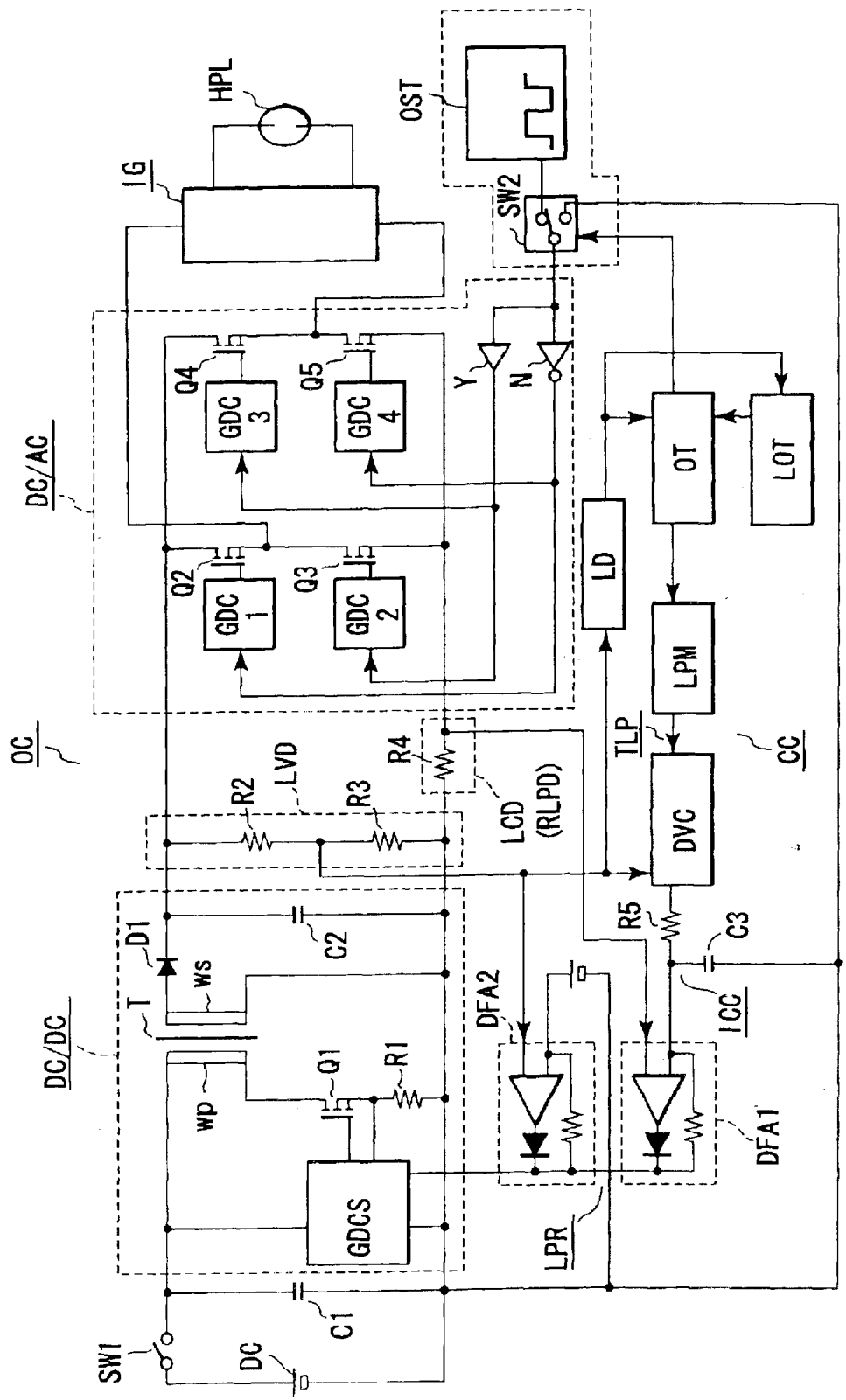
FIG. 8 is a circuit block diagram showing a first embodiment of the high pressure discharge lamp starter device of the present invention.
Figure 9:
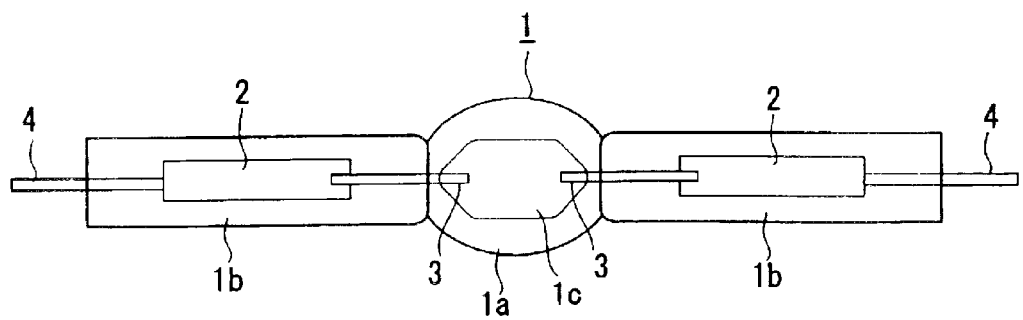
FIG. 9 is a longitudinal sectional view of the high pressure discharge lamp.
Figure 10:
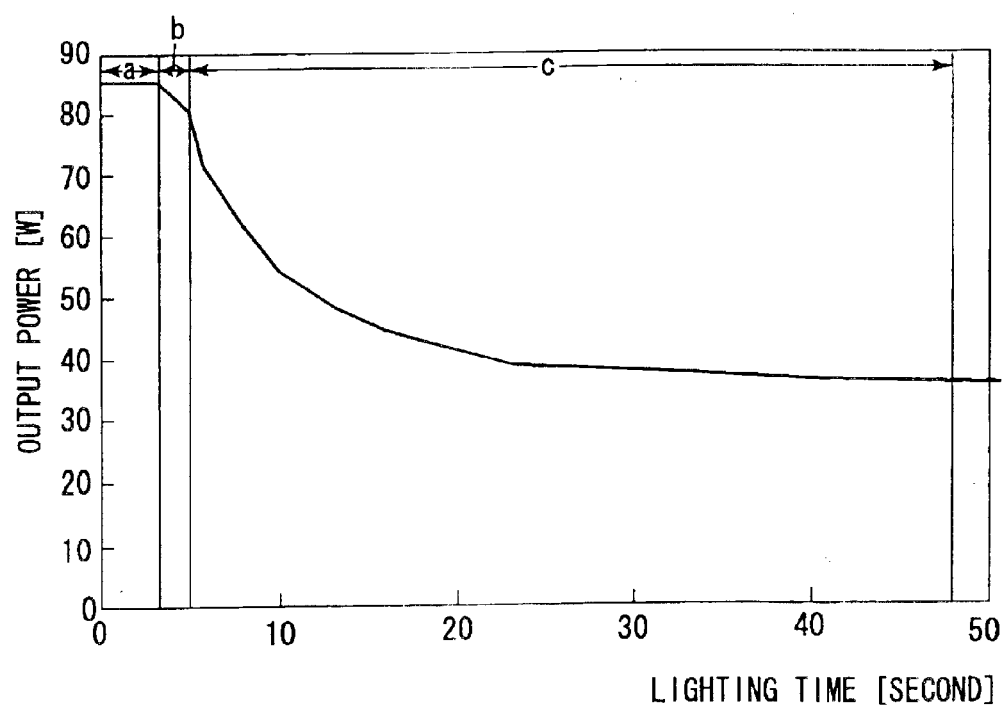
FIG. 10 is a graph showing the relationship between the light emission time and the output voltage.
Figure 11:
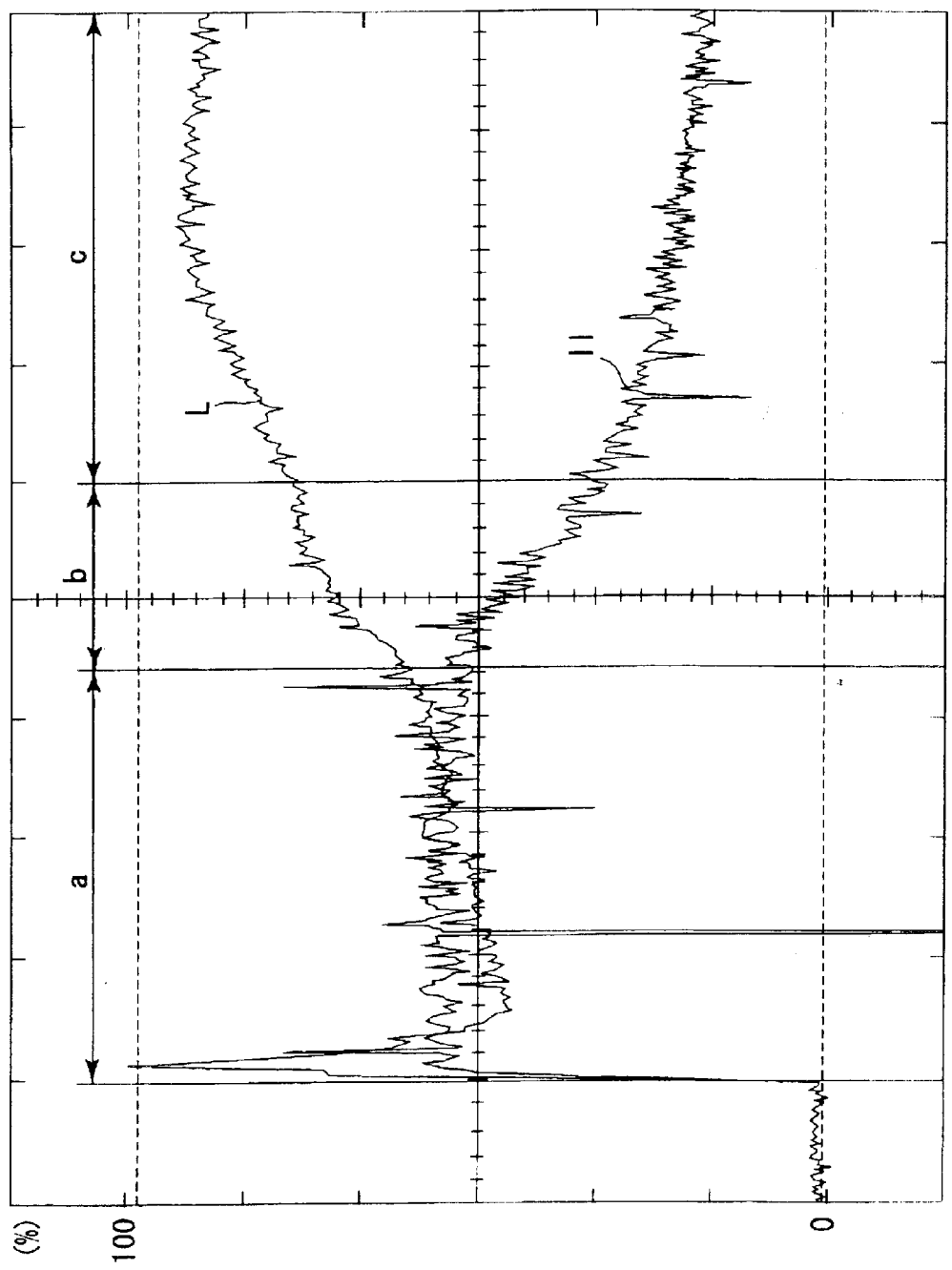
FIG. 11 is a graph showing the change of light output and lamp current versus the light emission time.

FIGS. 8 to 11 show a first embodiment of a high pressure discharge lamp starter device of the present invention. FIG. 8 is a circuit block diagram and FIG. 9 is a longitudinal sectional view of the high pressure discharge lamp. FIG. 10 is a graph showing the relationship between light emission time and output voltage. FIG. 11 is a graph showing change of light output and lamp current versus light emission time.

This embodiment shows a high pressure discharge lamp starter device for use in an automotive headlight device. In the figures, DC denotes a direct current source; SW1 a power supply switch, C1 an electrolytic condenser, OC a starter circuit, CC is a control means, IG an igniter, and HPL a high pressure discharge lamp. Individually structural elements will be explained below.

The direct current power source DC includes a battery providing a direct current (DC) voltage of 12V.

The power source switch SW1 is connected in series between the direct current power source DC and the starter circuit OC (described later) and responsible for turning on and off of the high pressure discharge lamp HDL.

The electrolytic condenser C1 is connected to the direct current source DC in parallel via a power source switch SW.

<Starter Circuit OC>

The starter circuit OC includes a switching regulator DC/DC and an inverter DC/AC.

(Switching Regulator DC/DC)

The switching regulator DC/DC includes mainly an output transformer T, switching means Q1, gate driving signal generating circuit GDCS, diode D1, and a smoothing condenser C2. The primary winding wp of the output transformer T and switching means Q1 are connected in series between both ends of the electrolytic condenser C1. The switching means Q1 includes a MOSFET. The resistor R1 inserted in series with the switching means Q1 is used for detecting switching current. The gate driving signal generating circuit GDGS generates a gate driving signal which is applied between the gate and source of the switching means Q1 and also controls the gate driving signal by pulse-width modulation (PWM) in accordance with the control signal input from the outside. To the both ends of a secondary winding ws of the output transformer T, the diode D1 and the smoothing condenser C2 are connected in series.

With this circuit arrangement, direct current output voltage of the switching regulator DC/DC, which has been increased, controlled and smoothed is obtained between both ends of the smoothing condenser C2.

(Inverter DC/AC)

The inverter DC/AC includes a full bridge-form inverter which comprises four switching means Q2 to Q5, gate driving signal generation circuits GDC1 to GDC4, a rectangular wave oscillation circuit OSC, switching means SW2, an inverter circuit N, and a non-inverter circuit Y. Four switching means Q2 to Q5, each being formed of a MOSFET, are connected to form a bridge circuit. To the input end of the bridge circuit is connected to the direct current output ends of the switching regulator DC/DC. Each of the gate driving signal generating circuits GDC1 to GDC4 forms a gate driving signal in synchronisms with an output signal or a direct current potential from the rectangular wave oscillation circuit OSC (described later) and passed through the inverter circuit N or the non-inverter circuit Y, and supply the gate driving signal between the gate and source of the corresponding switching means of Q2 to Q5 and turn on it. The rectangular wave oscillation circuit OSC oscillates an output signal of a rectangular wave having a frequency of 100 Hz to 2 kHz. The switching means SW2 connects the output signal from the rectangular wave oscillation circuit OSC and the direct-current potential selectively to the gate driving signal generation circuits GDC1 and GDC3 via the inverter circuit N and also connected to the gate driving signal generation circuits GDC 2 and GDC4 via a non-inverter circuit Y.

In this way, the output from the rectangular wave oscillation circuit OSC is applied to the gate driving signal generation circuits GDC1 to GDC 4 via the switching means SW2 and the inverter circuit N or non-inverter circuit Y, with the result that the switching means Q2, Q5 and the switching means Q3, Q4 are alternately switched and performs an inverter operation and then an AC output voltage can be obtained from the output end of the bridge circuit composed of these elements. Furthermore, DC potential is applied to the gate driving signal generation circuits GDC1 to GDC4 via the switching means SW2 and the inverter circuit N or the non-inverter circuit Y, with the result that switching means Q2 and Q5 are turned on, whereas the switching means Q3 and Q4 are turned off. Accordingly, DC output voltage can be obtained from the output end of the bridge circuit. In brief, the starter circuit OC can start up a high pressure discharge lamp HPL by direct current or alternatively current by selecting either one of a direct current output and alternating current output.

<Control Means CC>

The control means CC includes a lamp voltage detection means LVD, lamp current detection means LCD, tune-on detection means LD, light-emission time measuring timer OT, non light-emission time measuring timer LOT, a target lamp power set-up circuit TLP, actual lamp power detection means RLPD, and lamp power regulation means LPR.

(Lamp Voltage Detection Means LVD)

The lamp voltage detection means LVD includes a series circuit of a pair of resistors R2 and R3, which are connected between both ends of smoothing condenser C2 providing a direct current output voltage of the switching regulator DC/DC. At the both ends of the resistor R3, a partial voltage in proportional to the lamp voltage of the high pressure discharge lamp HPL can be obtained.

(Lamp Current Detection Means LCD)

The lamp current detection means LCD includes a resistor R4, which is inserted between the direct current output end of the switching regulator DC/DC and direct current input end of the inverter DC/AC. The voltage drop of the resistor R4 is proportional to lamp current.

(Turn-on Detection Means LD)

The turn-on detection means LD functions in response to the output from the lamp voltage detection means LVD. More specifically, when the high pressure discharge lamp HPL starts discharging, the voltage between its electrodes is apparently lower than no-load voltage previously appears. The turn-on detection means LD monitors the output detected by the lamp voltage detection means LVD and can detect the turn-on of the high pressure discharge lamp HPL when it detects a sharp decrease of the detection output.

(Light-emission Time Measuring Timer)

When the light-emission time measuring timer OT receives the output form the turn-on detection means LD, the timer starts measurement of the light emission time of a high pressure discharge lamp HPL. The output from the timer is sent to a target lamp power set-up circuit TLP (described later) and switching means SW2.

(Non Light-emission Time Measuring Timer LOT)

When the output from the turn-on detection means LD disappears, the non light-emission time measuring timer LOT starts operation to measure the non light-emission time of the high pressure discharge lamp HPL. The output from the timer is sent to the light-emission time measuring timer OT to change the initial value of the light-emission time measuring timer OT depending upon the non light-emission time.

(Target Lamp Power Setup Circuit TLP)

The target lamp power setup circuit TLP includes a target lamp power memory LPM, a division circuit DVC, an integration circuit ICC. The target lamp power memory LPM stores a target lamp power to be supplied to a high pressure discharge lamp HPL in accordance with light emission time and sends a target lamp power value to the lamp power regulation means (described later) in accordance with the light emission time. In this embodiment, target lamp power is set up by dividing it in first to third time zones, as shown in Table 1.

TABLE 1

| Time zone | Time (second) | Target lamp power (W) | Reduction rate (W/second) |
| --- | --- | --- | --- |
| First time zone | 0.0 | 85.0 | 0.00 |
| Second time zone | 3.4 | 85.0 | 3.13 |
| Third time zone | 5.0 | 80.0 | 9.00 |
| | 6.0 | 71.0 | 5.00 |
| | 8.4 | 59.0 | 3.13 |
| | 10.0 | 54.0 | 2.00 |
| | 12.0 | 50.0 | 1.50 |
| | 14.0 | 47.0 | 1.50 |
| | 16.0 | 44.0 | 0.75 |
| | 20.0 | 41.0 | 0.63 |
| | 24.0 | 38.5 | 0.18 |
| | 38.0 | 36.0 | 0.10 |
| | 48.0 | 35.0 | 0.00 |
| | 60.0 | 35.0 | |

Further, explanation will be made with respect to Table 1. The first time zone ranges from 0.0 to 3.4 seconds. The first target lamp power in this time zone is 85 W and the reduction rate is 0.00 (W/second). Similarly, the second time zone ranges from 3.4 to 5.0 seconds. The second target lamp power in this time zone is reduced at a constant reduction rate of 3.13 (W/second) from the initial second target lamp power 85 W to 80 W. Furthermore, the third time zone ranges from 5.0 to 48 seconds. The third target lamp power is reduced to 35 W in 48 seconds by staring a reduction rate of 9 (W/second) from the initial value of 80 W while sequentially lowering the reduction rate up to 0.00, to a stable light emission state.

The division circuit DVC divides the target lamp power sent from the target lamp power memory LPM by the lamp voltage obtained form the lamp voltage detection portion LVD to convert to the corresponding target lamp current. The integration circuit ICC includes a resistor R5 and a condenser C3 and provides a stable target lamp current.

(Actual Lamp Power Detection Means RLPD)

The actual lamp power detection means RLPD includes a lamp current detection means LCD and detects an actual lamp current corresponding to an actual lamp power.

(Lamp Power Regulation Means LPR)

The Lamp power regulation means LPR includes a first differential amplification circuit DFA1 and a second differential amplification circuit DFA2. The first differential amplification DFA1 includes an arithmetic amplifier. To its inversion input end, a target lamp current, that is, a target lamp power, is input, whereas to the non-inversion input end, an actual lamp current, that is, actual lamp power is input. In this way, the difference between the target lamp current (target lamp power) and the actual lamp current (actual lamp power) is output at the output end thereof. The output end is connected to a control input end of the gate driving signal generation circuit GDCS of the switching regulator DC/DC. The second differential amplification circuit DFA2 is connected in parallel to the first differential amplification circuit DFA1. A reference voltage source E is connected to the inversion input end, whereas the output end of the lamp voltage detection portion LVD is connected to the non-inversion input end. The reference voltage source E acts as a feedback control circuit of non-load voltage and responsible for maintaining the output voltage of the high pressure discharge lamp HPL before the startup to be constant.

<Igniter IG>

The igniter IG has a customary structure. The igniter starts operation when the power supply switch SW1 is turned on to supply a predetermined startup pulse. The startup pulse thus generated is applied to the high pressure discharge lamp HPL (described later).

<High Pressure Discharge Lamp HPL>

The high pressure discharge lamp HPL has the structure shown in FIG. 9. More specifically, the high pressure discharge lamp HPL comprises an airtight chamber 1, discharge medium, deposited metal foil 2, a pair of electrodes 3,3 and a leading-in line 4.

The airtight chamber 1 includes an envelop portion 1a and a pair of sealed portions 1b, 1b. The envelope portion 1a has a hollow spindle form and houses a long and narrow-cylindrical discharge space 1c formed in the axis direction. The pair of sealed portions 1b, 1b are continuously formed at both ends of the envelope portion 1a.

The deposited metal foil 2 is formed of a ribbon-form molybdenum and placed airtight within the sealed portions 1b, 1b of the airtight chamber 1 by vacuum sealing.

The pair of electrodes 3,3 has a straight-rod form shaft portion 3a. The distal end portion 3b of the electrode shaft, from which arc discharge is initiated, is a semispherical curved surface having a diameter not larger than half the diameter of the shaft portion 3a and formed entirely over the distal end portion. The proximal end portion 3c projects into one of the pair of sealed portions 1b, 1b of the airtight chamber 1 and supported by the portions. Each of the distal end portions passes through both ends of the envelope portion 1a of the airtight chamber 1 and projects into the discharge space 1c. The electrodes are mutually faced at a distance of 5 mm or less apart from each other. The proximal end of each of the pair of electrodes 3, 3, connects to one end of the deposited metal film 2. The leading in line 4 is connected to the other end of the deposited metal foil 2 by welding and extends outside of the airtight chamber 1 through the sealed portion 1b.

The airtight chamber 1a is charged with a light emitting metal and a metal halide and xenon for producing lamp voltage, as a discharge medium.

EXAMPLES

Airtight chamber 1:
formed of quartz

| | |
|---|---|
| Outer diameter: | 6 mm, |
| Inner diameter: | 2.7 mm, |
| Length of envelope: | 7.0 mm |

Electrode 3:
formed of tungsten

| | |
|---|---|
| Diameter of shaft: | 0.35 mm |
| Radius of curved surface of the tip portion at which arc is initiated: | 0.175 mm |
| Distance between electrodes: | 42 mm |
| Length of projection: | 1.4 mm |

Discharge medium

| | |
|---|---|
| Metal halide: | $ScI_3$—$NaI$—$ZnI_2$ = 0.8 mg |
| Xenon: | 10 atoms at 25° C. |

Electric characteristics:

| | |
|---|---|
| Lamp power: | 35 W |
| Lamp voltage: | 42 V |
| (values at stable time) | |

<Circuit Operation>

(Circuit Operation During Low-temperature Startup)

In the low-temperature startup, the high pressure discharge lamp HPL is cooled to a level at least room temperature because a sufficient time has passed since a previous turn off time. In this state, when a power-source switch is turned on, the switching regulator DC/DC of the starter circuit OC starts up to supply a direct current controlled at a predetermined value between input ends of the inverter DC/AC. Since the switching means SW2 has been switched to the lower side in the figure, the switching means Q3, Q4 of inverter DC/AC are turned on and the switching means Q2, Q5 are turned off. The inverter DC/AC acts as a simple direct-current starter circuit to apply direct current voltage to the igniter IG and the high-pressure lamp HPL. Subsequently, the igniter IG generates high-pressure pulse voltage, which is applied to the high pressure discharge lamp HPL. As a result, the high pressure discharge lamp HPL is initiated and turned on under application of the DC voltage. In other words, the lamp is turned on by direct current. Once the high-pressure discharge lamp is turned on, the voltage of the input end of the igniter IG decreases to the lamp voltage, the igniter IG stops the generation of the high-pressure pulse.

When the high pressure discharge lamp HPL is turned on, the turned-on of the lamp is detected by the turn-on detection means LD. Subsequently, the light-emission time measuring timer OT initiates its operation (time-measuring); at the same time, the non light-emission time measuring timer LOT stops its operation. The initial value of the light-emission time measuring timer OT is changed depending upon the non-light emission time. Note that the initial value of the light emission time during the low-temperature startup time is set at 0 second.

Subsequently, when the light-emission time measuring timer OT functions for a predetermined time, a control signal is input from the light-emission time measuring timer OT to the switching means SW2. As a result, the switching means SW2 is moved up to connect to the upper part. In this manner, the output signal from the rectangular wave oscillation circuit OSC passes through the switching means SW2, inverter circuit N and non-inverter circuit Y and is applied to gate driving signal generation circuits GDC1 to GDC4 of the inverter DC/AC. As a result, the switching means Q2, Q5 and Q3, Q4 were driven by the gate driving signal in accordance with ON and OFF of the output signal of the rectangular wave generation circuit OSC and alternately turned on and off. Accordingly, the inverter operation is initiated. As a result, the high pressure discharge lamp HPL is turned on by alternating current.

On the other hand, the light emission time measuring timer integrates the light emission time. Every time an integration value, that is, light emission time, is obtained, the timer sends the value to the target lamp power memory LPM of the target lamp power setup circuit TLP. The target lamp power memory LPM sends a target lamp power corresponding to the light emission time thus received to the division circuit DVC. The division circuit divides a target lamp power by a lamp voltage to convert into a target lamp current and output it to the integration circuit ICC. The integration circuit ICC stabilizes a target lamp current and thereafter input the target lamp current, that is, the target lamp current, to an inversion input end of the first differential amplification circuit DFA1 in the lamp power regulation means LPR. On the other hand, since an actual lamp current (actual lamp power) is input to a non-inversion input end, the difference between the target lamp current (target lamp power) and the actual lamp current (actual lamp power) is output from the output end of the first differential amplification circuit DFA1. The difference is further input to a control input end of the gate drive signal generation circuit GDCS of a switching regulator DC/DC.

When the difference is input to the control input end of the gate drive signal generation circuit GDCS of the switching regulator DC/DC, the switching regulator DC/DC is controlled by PWM. As a result, the direct current changes in the direction of reducing the differentiation. As a result, the target lamp power is input to the high pressure discharge lamp HPL. Therefore, as shown in FIG. 10, the high pressure discharge lamp is turned on while being controlled under the lamp power which changes along the target lamp power previously set with the passage of the light emission time.

The change of output power versus light emission time of the present embodiment is shown in FIG. 10. In the figure, the horizontal axis denotes light emission time (second) and the vertical axis denotes output voltage (W). Time a denotes a first time zone, time b denotes a second time zone, and time c denotes a third time zone. A metal halide is designed to vaporize during the second time zone b. As is apparent from the figure, the lamp power changes along with the target lamp power shown in Table 1

The change of light output and lamp current versus light emission time of the present embodiment is shown in FIG. 11. In the figure, the horizontal axis denotes time and the vertical axis denotes light output L and lamp current 11, each being indicated by arbitrary values. Curve L indicates light output and Curve IL indicates lamp current. Time a, b, c denotes a first time zone, second time zone, and third time zone, respectively. As is understood from the figure, since lamp power is properly controlled even during the second time zone where a metal halide is abruptly vaporized, light output rises smoothly from the first time zone where about 50% of light is output due to a rare gas discharge to the third time zone where 100% of light is output. Note that pulse-form light is emitted in the beginning of light emission. This is caused during a transition time from glow to arc. The transition time, however, is extremely short. The transition time therefore will not substantially affect the illumination. The energy is supplied mainly from the electrolytic condenser C2.

(Circuit Operation During High-temperature Startup)

The high-temperature startup is one where a high pressure discharge lamp HPL is turned off for a short time (e.g., 10 seconds) and then restarted up. Since the passage of time after a previous turn-off is short, the high pressure discharge lamp HPL is still placed under higher temperature conditions compared to room temperature. The metal vapor pressure within the lamp tube is still high. In this case, the output from non light-emission time measuring timer LOT is relatively low, the initial value of the light emission timer OT is reduced to 10 seconds. The value of the target lamp power output from the target lamp power setup circuit TLP becomes 54 W, which is relatively close to the rated lamp power.

On the other hand, when the power switch SW1 is turned on, an igniter IG is started operation by a DC output voltage of the switching regulator DC/DC to generate a startup pulse. As a result, the high pressure discharge lamp HPL is turned on to emit light. When lamp voltage detection means LVD detects the turn-on, and synchronously the light-emission time measuring timer OT initiates its operation and the non light-emission time measuring timer terminates the operation.

Figure 12:
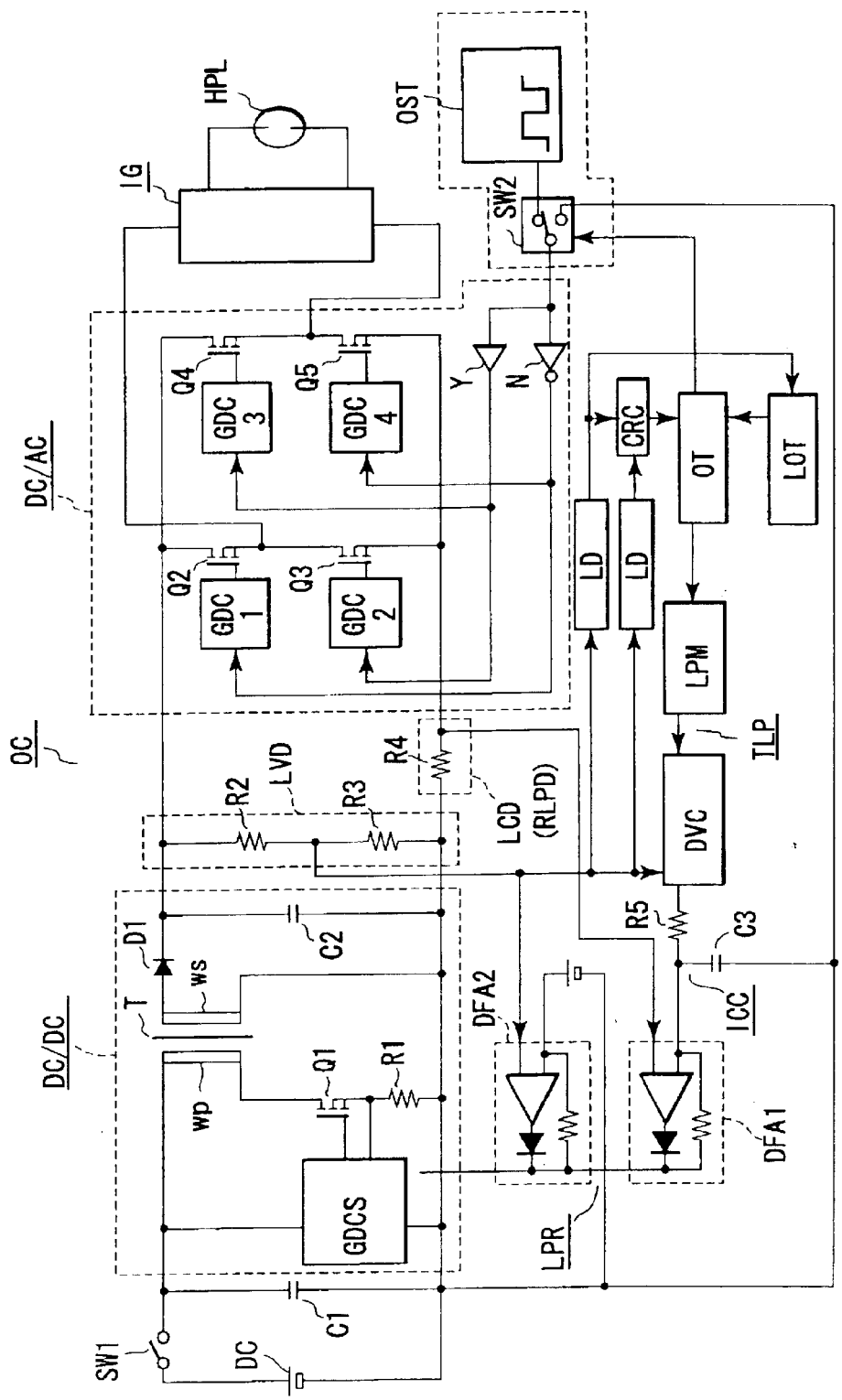
FIG. 12 is a circuit block diagram showing a second embodiment of the high pressure discharge lamp starter device of the present invention.
Figure 13:
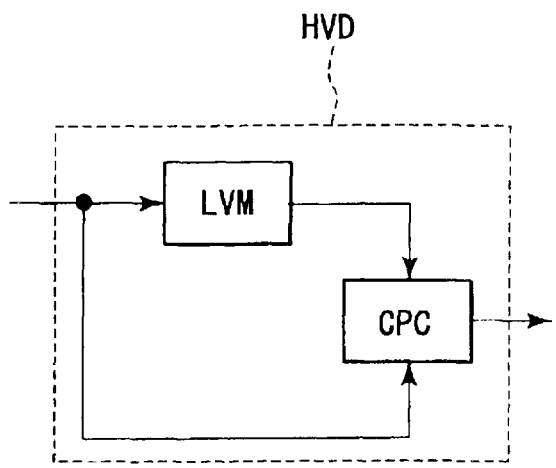
FIG. 13 is a circuit block diagram showing a halide abrupt vaporization detection means.
Figure 14:
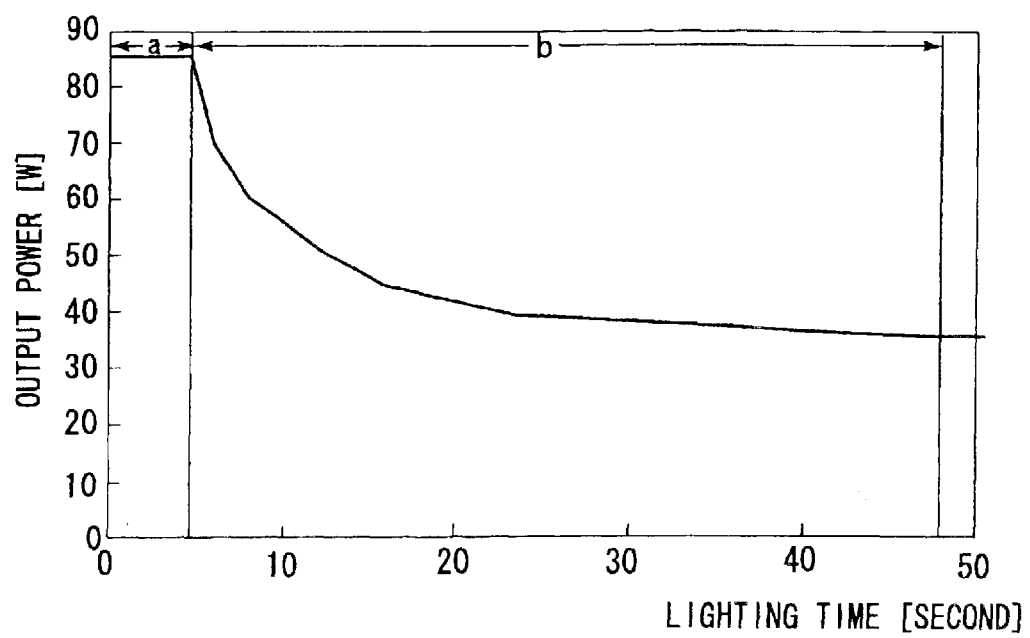
FIG. 14 is a graph showing the relationship between the light emission time and output voltage.

FIGS. 12 to 14 show a second embodiment of the high pressure discharge lamp of the present invention. FIG. 12 is a circuit block diagram. FIG. 13 is a circuit block diagram of a halide abrupt vaporization detection means. FIG. 14 is a graph showing the relationship between the light emission time and the output voltage. In each of the figures, like reference symbols are used to designate like structural elements of FIGS. 8 and 10, and any further explanation will be omitted for brevity's sake. The present embodiment differs from the first embodiment in that halide abrupt vaporization detection means HVD and a complementary circuit CC are added and a different target lamp power is used.

More specifically, the halide abrupt vaporization detection means HVD is connected to the turn-on detection means LD in parallel. The halide abrupt vaporization detection means HVD includes a post-startup lamp voltage memory unit LVM and a comparison unit CPC. The post-startup lamp voltage memory unit LVM stores lamp voltage immediately after the startup of the high pressure discharge lamp HPL. The term "immediately after the startup" means about 0.4 to 0.6 seconds after the startup. To one of the input ends of the comparison unit CPC, memory data of the post-startup lamp voltage memory unit LVM is input and, to the other input end, lamp voltage changing with time is input. When the difference between the input ends coincides with a predetermined value within the range of 1 to 3V, output is obtained.

Furthermore, a correction circuit CRC is interposed between the turn-on detection means LD and the light emission time measuring timer OT and also controlled by the detection output from the halide abrupt vaporization detection means HVD.

On the other hand, in this embodiment, the target lamp power is set each of divided time zones, a first and second time zones, as shown in Table 2.

TABLE 2

| Time zone | Time (second) | Target lamp power (W) | Reduction rate (W/second) |
|---|---|---|---|
| First time zone | 0.0 | 85.0 | 0.00 |
|  | 3.4 | 85.0 | 0.00 |
| Second time zone | 4.6 | 85.0 | 9.38 |
|  | 6.2 | 70.0 | 5.00 |
|  | 8.4 | 59.0 | 2.50 |
|  | 10.0 | 54.0 | 2.00 |
|  | 12.0 | 50.0 | 1.50 |
|  | 14.4 | 47.0 | 1.88 |
|  | 16.0 | 44.0 | 0.75 |
|  | 20.0 | 41.0 | 0.63 |
|  | 24.0 | 38.5 | 0.18 |
|  | 38.0 | 36.0 | 0.10 |
|  | 48.0 | 35.0 | 0.00 |
|  | 60.0 | 35.0 |  |

Further, explanation will be made with respect to Table 1, the first time zone ranges from 0.0 to 4.6 seconds. The first target lamp power of the first time zone is 85 W and the reduction rate is a constant value of 0.00 (W/second). Similarly, the second time zone ranges from 4.6 to 48 seconds. Reduction is initiated at a reduction rate of 9.38 (W/second) from the second target lamp power of 85 W to 35 W for 48 seconds, at which the reduction rate becomes 0.00 and light emission becomes stable.

Change of output power with light emission time in this embodiment is shown in FIG. 13. In the figure, the horizontal axis indicates light emission time (seconds) and the vertical axis indicates output voltage (W). Time a is a first time zone and time b is a second time zone. The period of the second time zone is corrected when a metal halide abrupt vaporization is detected by the halide abrupt vaporization detection means HVD, and then, the second time zone is initiated by changing the light-emission time measuring timer OT. As is apparent from the figure, lamp power changes along the target lamp power shown in Table 2.

In this embodiment, when abrupt vaporization of a metal halide is detected by the halide abrupt vaporization detection means HVD, the correction circuit CRC is controlled to the operation of the light emission time measuring timer OT to terminate the first time zone and start the second time zone. In this manner, the second target lamp power is output to lamp power regulation means LPR from the target lamp power setup circuit TLP in place of the first target lamp power.

Figure 15:
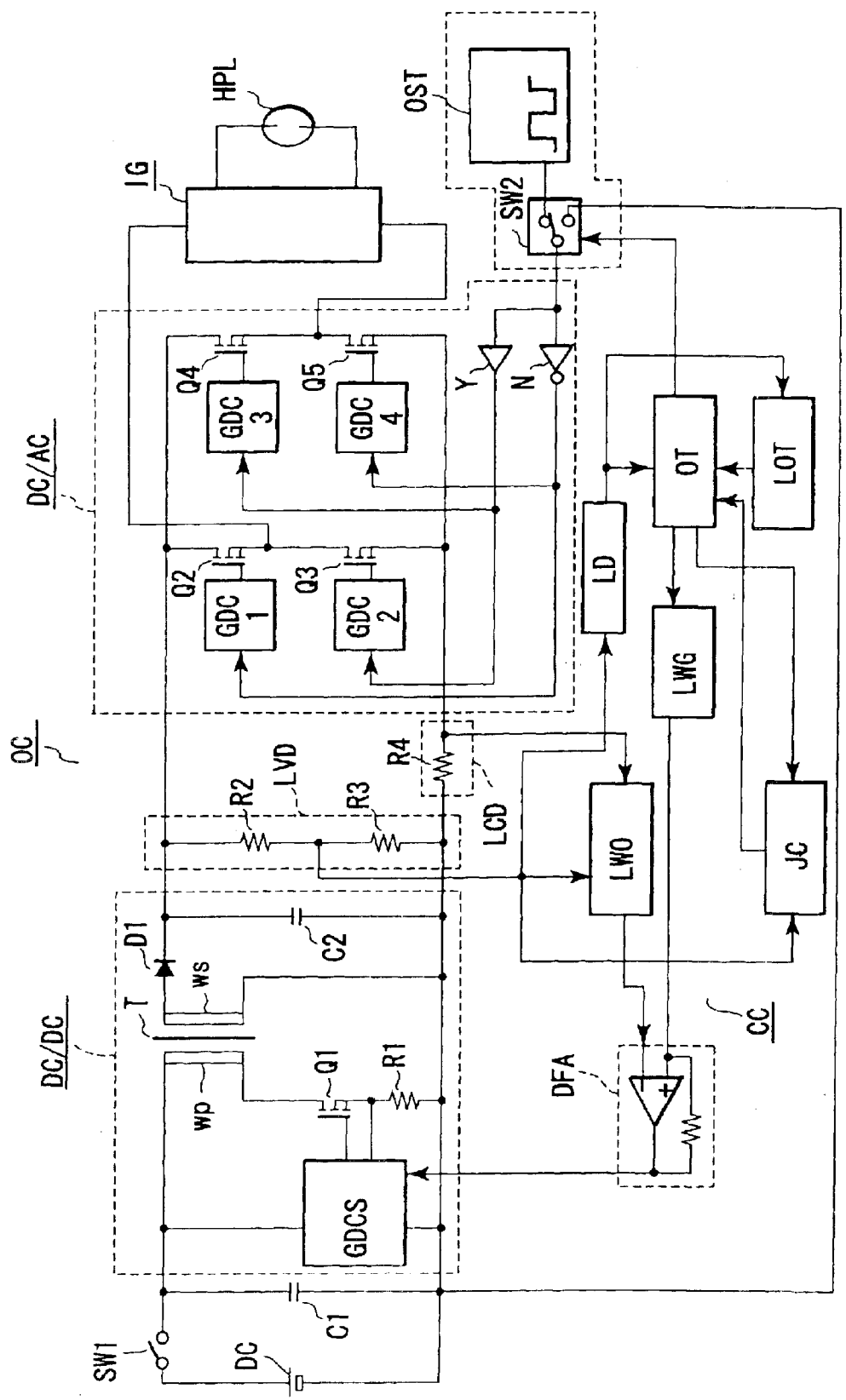
FIG. 15 is a circuit block diagram showing a third embodiment of the high pressure discharge lamp starter device of the present invention.
Figure 16:
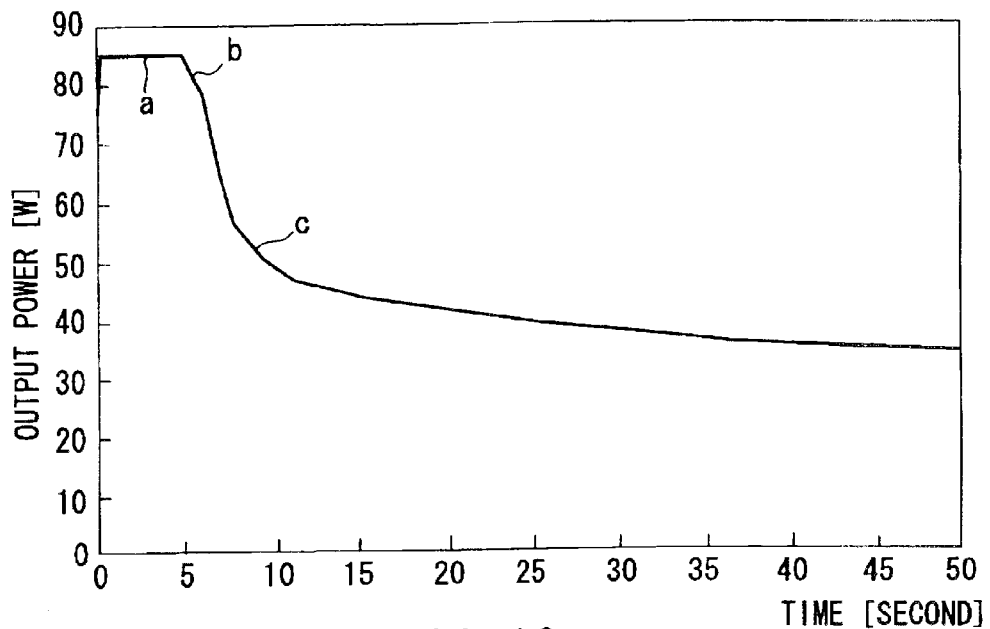
FIG. 16 is a graph showing target lamp power characteristics.
Figure 17:
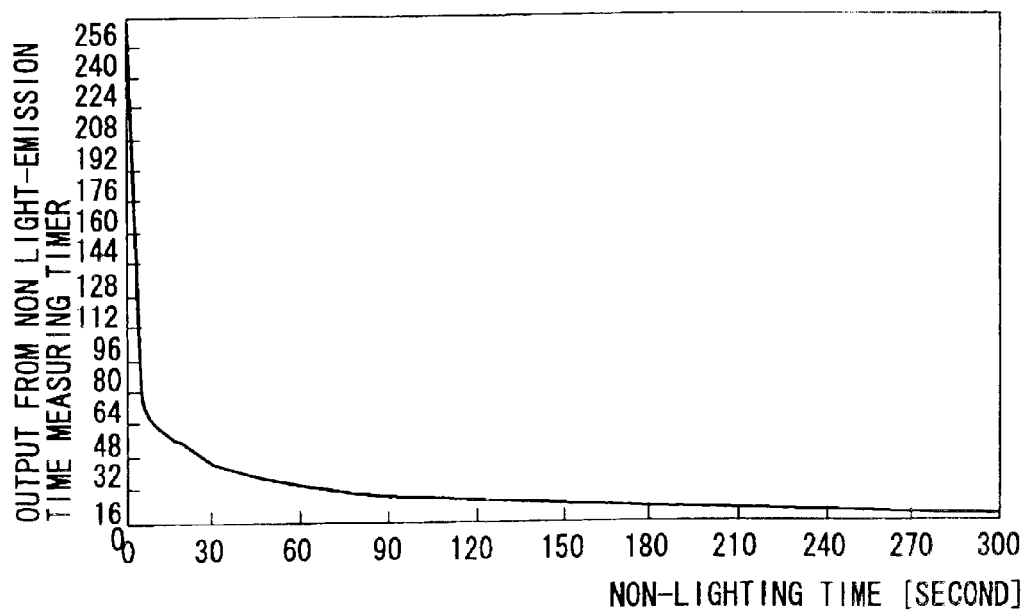
FIG. 17 is a graph showing the output characteristics of a non light-emission time measuring timer.
Figure 18:
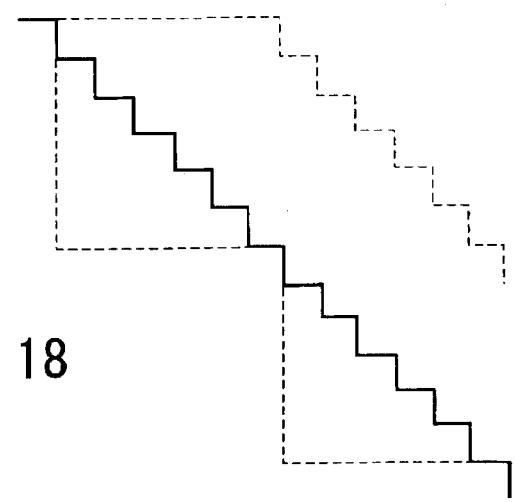
FIG. 18 is a graph showing the relationship between a target lamp power and an actual lamp power with time where the time width is enlarged.
Figure 19:
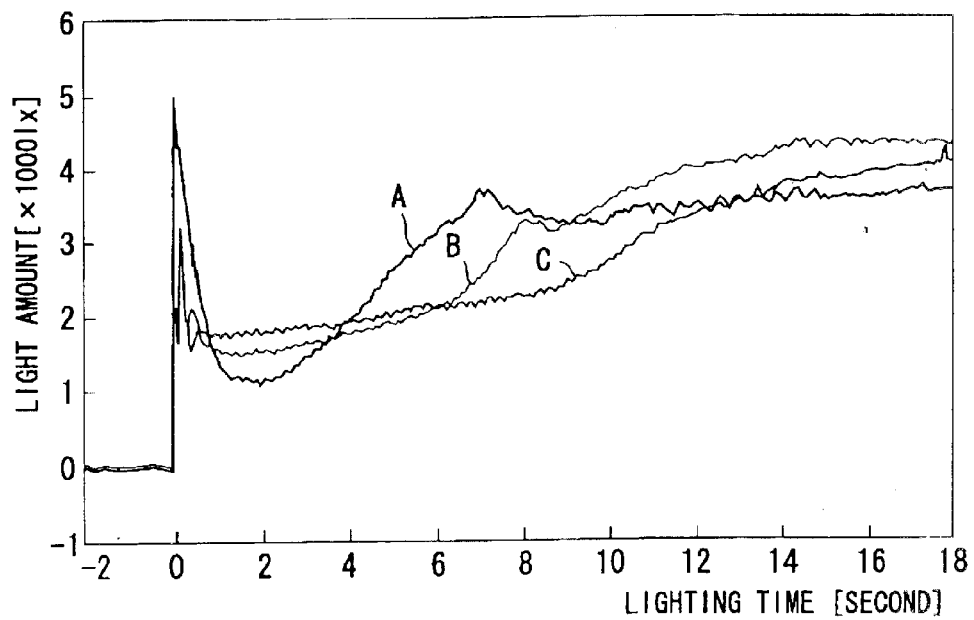
FIG. 19 is a graph showing a light-amount rise when three high pressure discharge lamps having different light amount rise characteristics.
Figure 20:
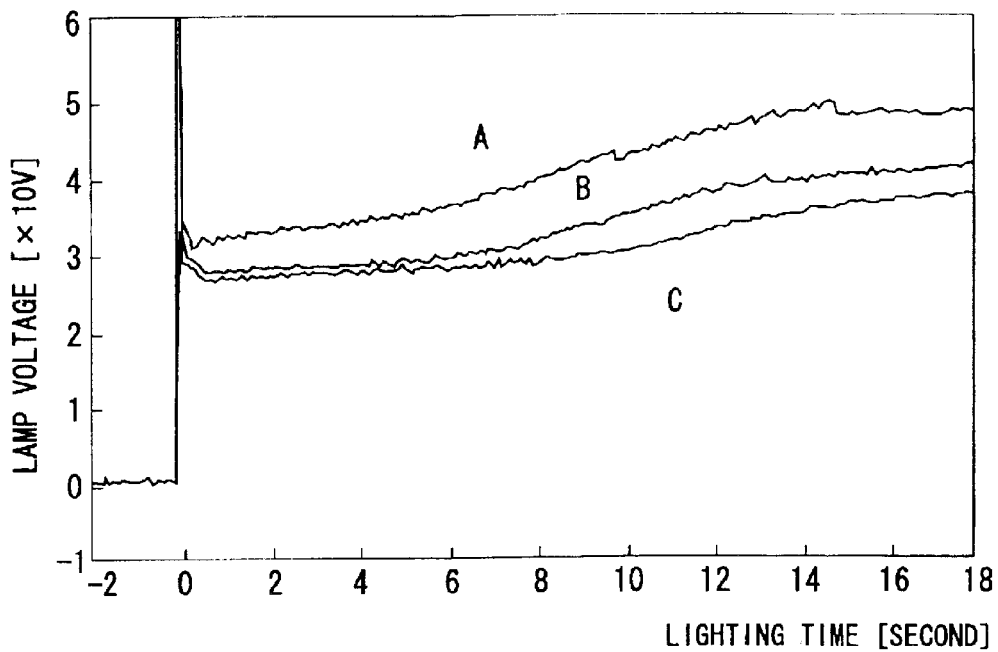
FIG. 20 is a graph showing change of lamp voltage.
Figure 21:
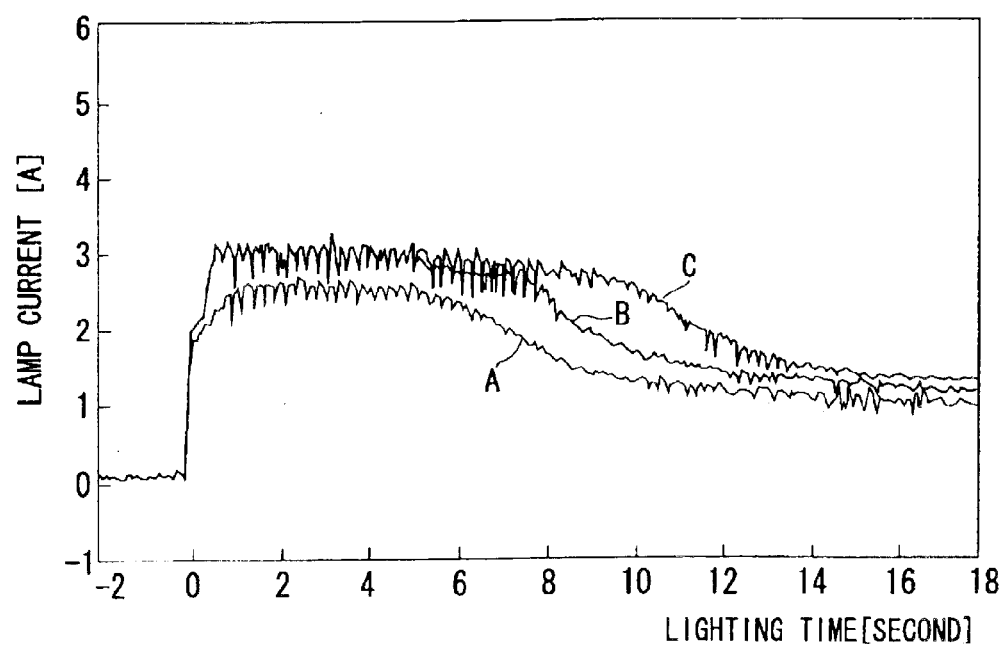
FIG. 21 is a graph showing change of lamp current.

FIGS. 15 to 21 show a third embodiment of the high pressure discharge lamp starter device of the present invention. FIG. 15 is a circuit block diagram. FIG. 16 is a graph showing target lamp power characteristics. FIG. 17 is a graph showing output characteristics of non light-emission time measuring timer. FIG. 18 is a graph showing the relationship between target lamp power and actual lamp power. In FIG. 18, the time width of the figure is enlarged. FIG. 19 is a graph showing rise of the light amount when three high pressure discharge lamps different in light amount rise characteristics are turned on. Similarly, FIG. 20 is a graph showing change of lamp voltage and FIG. 21 is a graph showing change of lamp current. In each of figures, like reference symbols are used to designate like structural elements in FIG. 8 and any further explanation will be omitted for brevity's sake.

This embodiment differs from other embodiments principally in that it comprises a judgment means JC. The judgement means JC has a means for obtaining a first lamp voltage by inputting a detection output by lamp voltage detection means LVD; a means for storing its measurement value (detection value) as the first lamp voltage; a means for obtaining lamp voltage next time the lamp voltage decreases, as a second lamp voltage; a means for reading out the first lamp voltage from the memory means and subtracting the first lamp voltage from the second lamp voltage, and a means for judging that the lamp voltage is increasing if the subtraction result is equal to or larger than a predetermined value and therefore determining that lamp power may be reduced, or that the lamp power may not be reduced if the subtraction result does not reach the predetermined value. The judgment means JC measures lamp voltage in synchronisms with reduction of lamp power by supplying data of light-emission time from the light-emission time measuring timer OT. The judgment output that lamp power may not be reduced is output from the judgment means JC and input the light-emission time measuring timer OT in order control the timer, thereby resetting the count value of the light-emission time measuring timer OT.

On the other hand, the control of lamp power is performed by the following manner in this embodiment. An actual lamp power and a target lamp power are compared and the actual lamp power is made equal to the target lamp power by controlling the switching regulator. To measure the actual lamp power, a lamp voltage detection means LVD and a lamp power arithmetic means LWO for calculating the actual lamp power based on the detection output from the lamp current detection means LCD. To obtain the target lamp power, a target lamp power arithmetic means LWG is arranged. The output from the lamp power arithmetic means LWO and the output from the target lamp power arithmetic means LWG are input to respective ends of a differential amplification circuit DFA. Subsequently, the output in accordance with the difference between them is input to a PWM control terminal of a gate driving signal generation circuit GDCS of the switching regulator DC/DC. As a result, the direct current output voltage of the switching regulator DC/DC actual lamp power is controlled by PWM to make the actual lamp power close to a target lamp power.

In the target lamp power arithmetic means LWG, target lamp power characteristics are previously set as shown in FIG. 16. Note that the target lamp power characteristics are not apparent in the figure and set so as to slightly change stepwise. The target lamp power characteristics comprises a first target lamp power a, a second target lamp power b, and a third target lamp power c. The first target lamp power a is supplied in the range of the startup to 5 seconds and set at 85 W, which is 2.5 times the rated lamp power 35 W of the high pressure discharge lamp HPL. The second target lamp power b is supplied during a time period of 1.5 seconds following the first target lamp power a and linearly decreases up to 79V at a reduction rate of 4 W/second. The third target lamp power c is supplied during a time period of 44 seconds following the second target lamp b and gradually decreases to the rated lamp power 35 W. The reduction rate is large in the beginning and gradually decreases. Accordingly, the light emission becomes stable in 50 seconds after the lamp is turned on.

Figure 7:
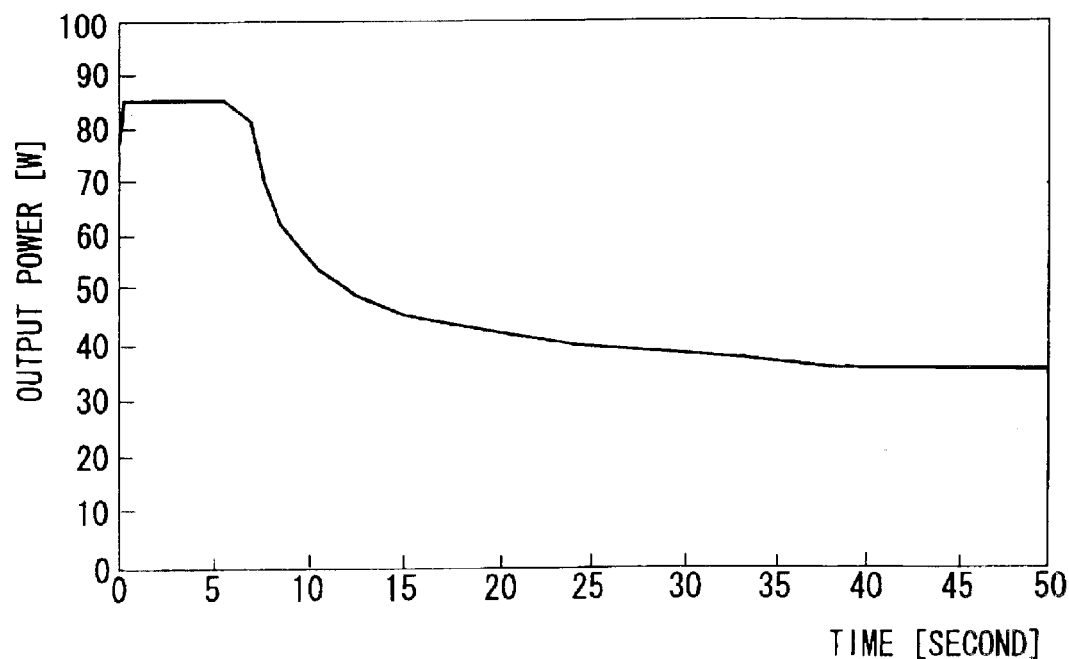
FIG. 7 is a graph showing target lamp power characteristics set up in a high pressure discharge lamp starter device used for use starting up the first to third mercury free lamps.

In this embodiments explained above, the target lamp power characteristics can be more easily understood by comparing to those shown in FIG. 7. The time period during which the first target lamp power a is supplied, is reduced by 0.5 seconds. The reduction rate of the second target lamp power b increases. This is because in consideration of different light amount rise characteristics varied between individual high pressure discharge lamps, the characteristics are set in accordance with the high pressure discharge lamp exhibiting the fastest light amount rise.

On the other hand, as shown in FIG. 17, the non light-emission time measuring timer LOT is set up such that the timer output decreases as the non light-emission time increases. Not lower than 80% of the total output changes from the beginning to a first 10 seconds. More specifically, explanation will be made by taking the case where the lamp is restarted up in 5 seconds after turning-off the light, as an example. Since the output value from the non light-emission time measuring timer LOT is 64 in 5 seconds after the turn-off, the value 12.8, which is obtained by multiplying the value of 64 by 0.2, corresponds to the light-emission time (second) when the lamp is turned on at room temperature (cold startup). The non light-emission time measuring timer LOT sets a counter value so as to turn up the light in 12.8 seconds. Accordingly, in the target lamp power characteristics shown in FIG. 16, the high pressure discharge lamp HPL is turned on by supplying a target lamp power of 46 W at a time point of 12.8 seconds. After the time point of 12.8 seconds, the actual lamp power is reduced toward the rated lamp power in accordance with the target lamp power characteristics, thereby going into stable light emission operation.

Next, referring to FIG. 18, the process for reducing an actual lamp power in accordance with the target lamp power characteristics will be explained. In the figure, a solid line indicates actual lamp power, a dotted line indicates target lamp power characteristics, a broken line indicates an actual lamp power when control is made based on the judgment that reduction may not be performed. Time passes from the left-hand side to the right hand side in the figure. Note that the time axis is greatly enlarged compared to that of FIG. 16. More specifically, the target lamp power is set stepwise. In contrast, the actual lamp power is controlled in a plurality of times while judgment is performed, within a time period during which a single value of target lamp power is maintained. Since changing of the actual lamp power accompanies inertia, the actual lamp power changes almost continuously but relatively a little stepwise.

Figure 1:
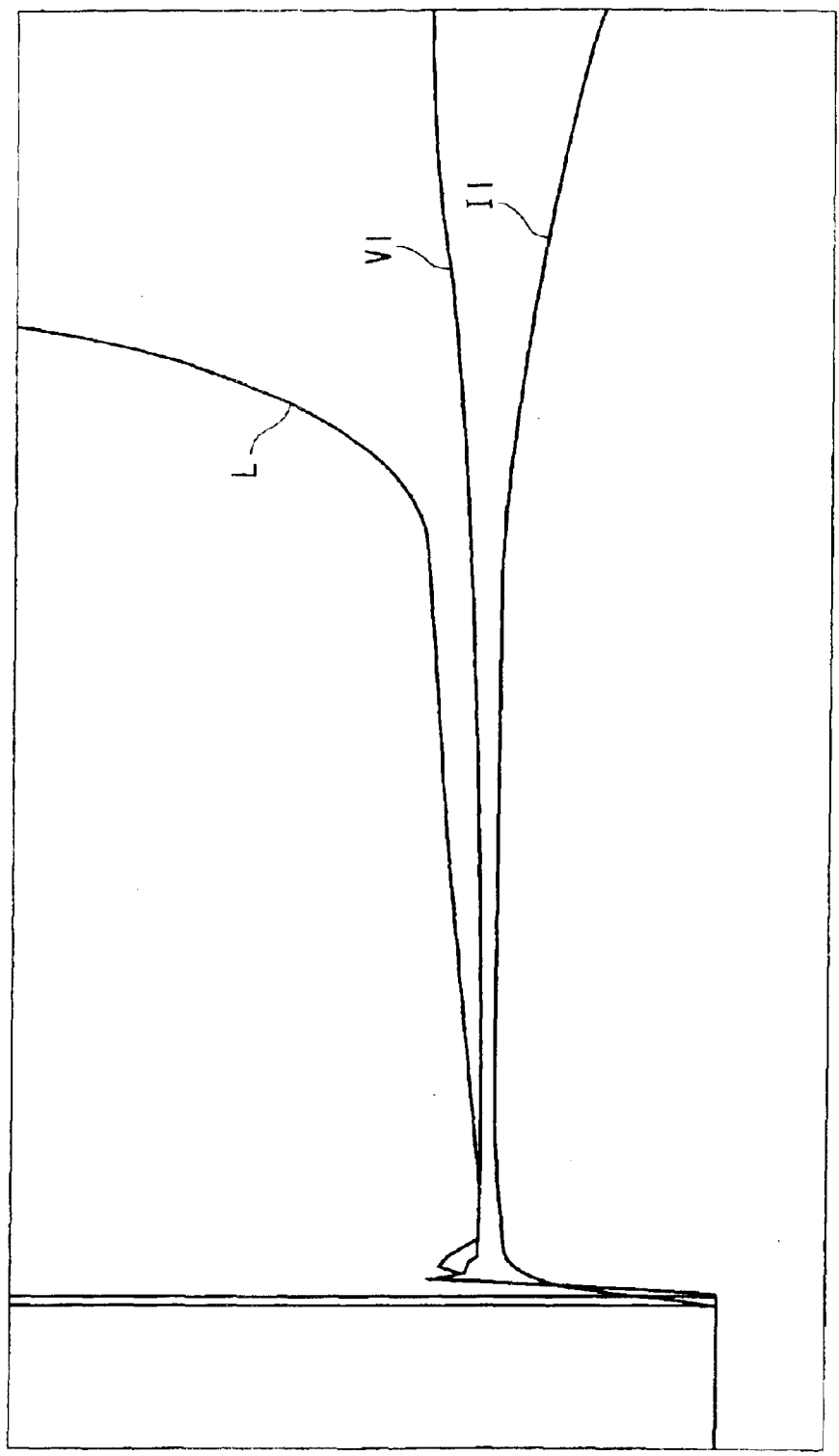
FIG. 1 is a graph showing change of lamp voltage (VI), lamp current (II) and light output (L) during the start up of a virtually mercury-free metal halide lamp.
Figure 2:
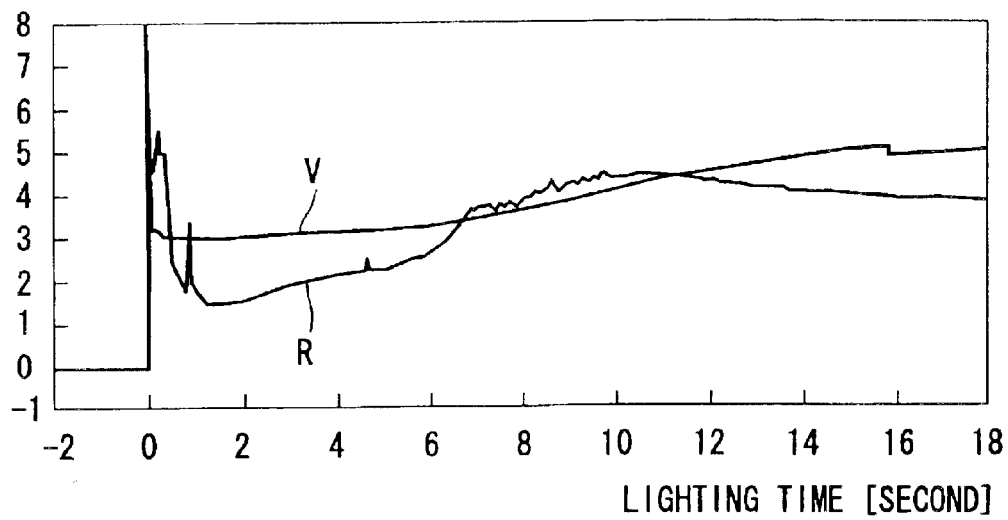
FIG. 2 is a graph showing change of light amount and lamp voltage versus light-emission time when a first mercury free lamp is started up by use of a high-pressure discharge starter device having the same light output characteristics.
Figure 3:
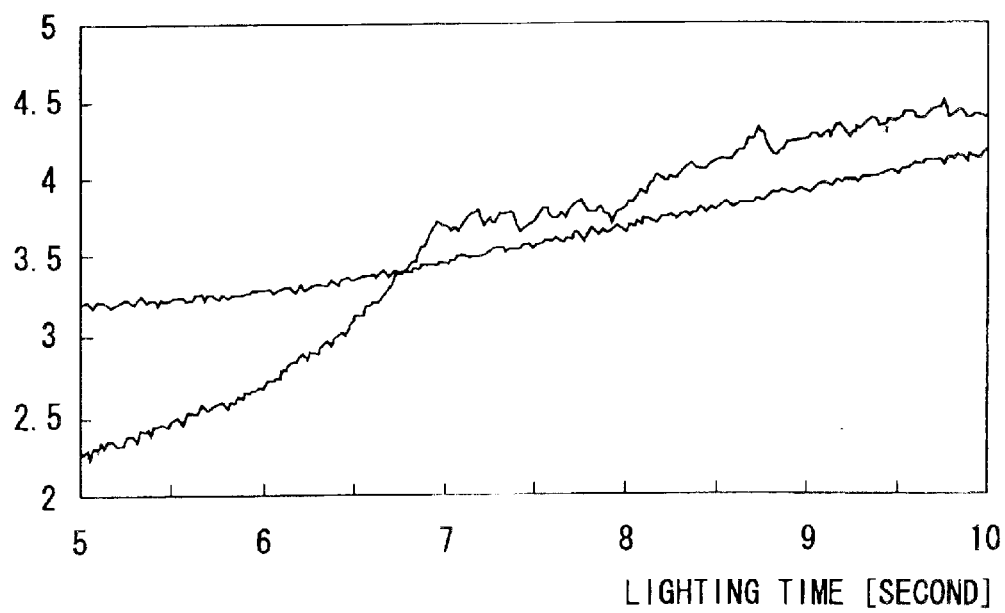
FIG. 3 is a graph showing an enlarged gist portion of FIG. 2.
Figure 4:
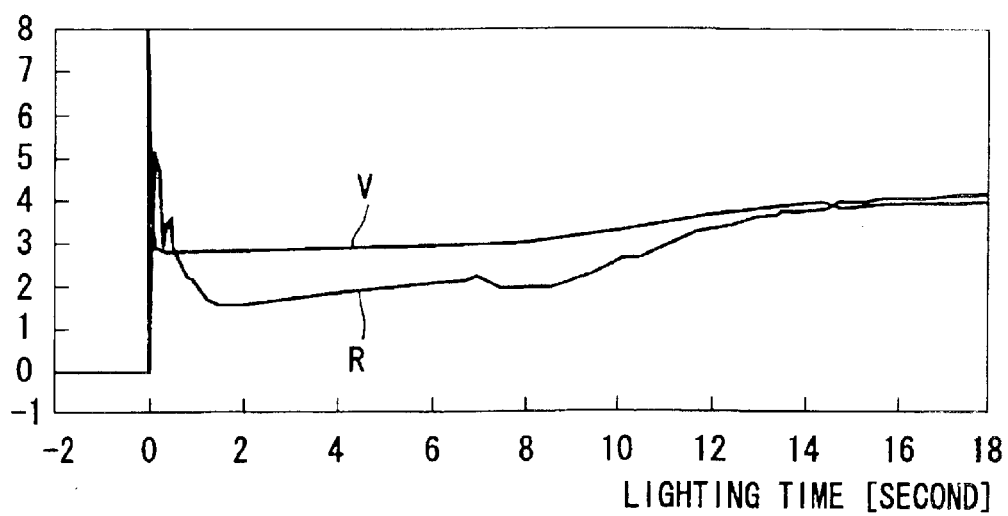
FIG. 4 is a similar graph to FIG. 2, with respect to a second mercury free lamp.
Figure 5:
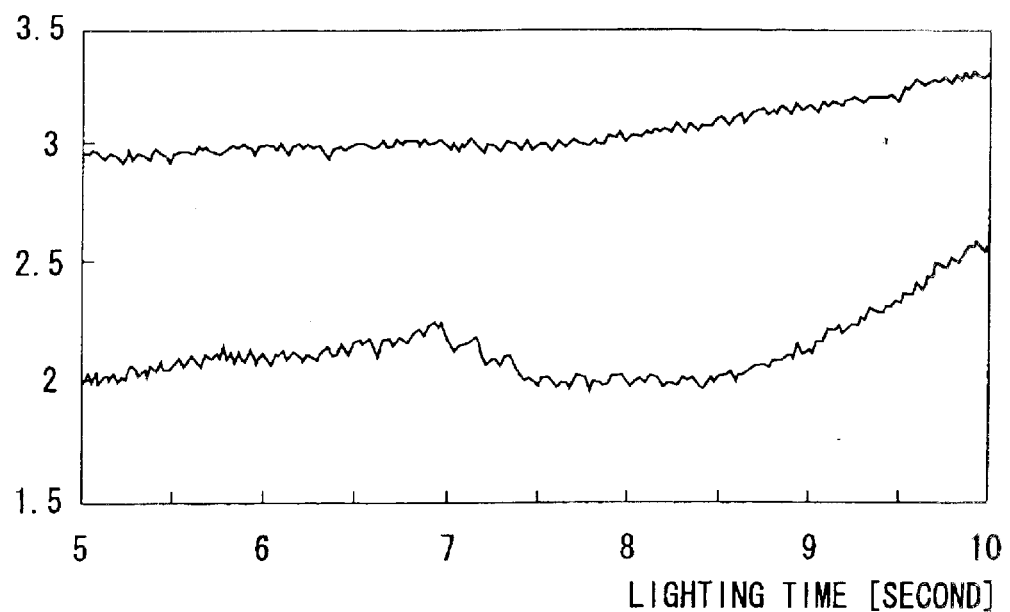
FIG. 5 is a graph showing an enlarged gist portion of FIG. 4.
Figure 6:
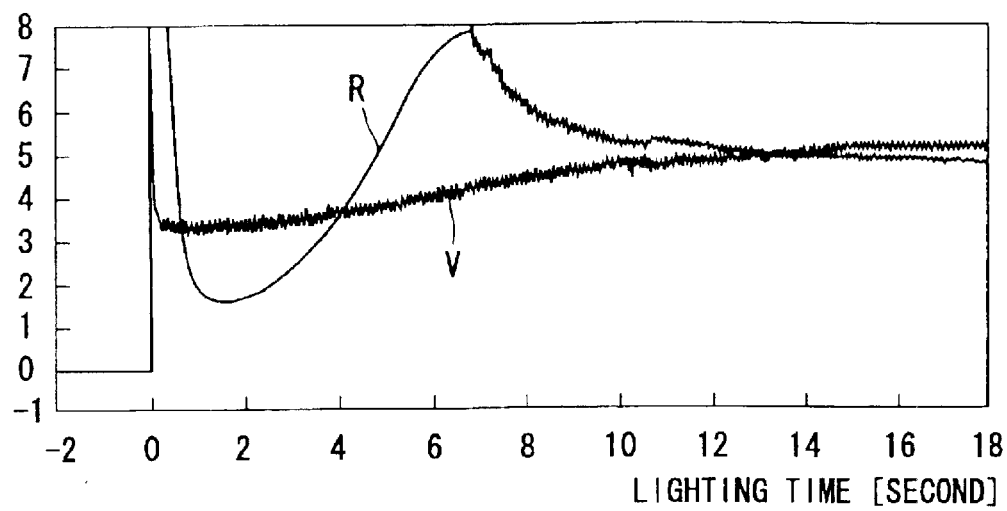
FIG. 6 is a similar graph to FIG. 2, with respect to a third mercury free lamp.

As a result of the operation above, even if the high pressure discharge lamp may vary in light amount rise characteristics, in the case of the cold startup, the lamp power gradually decreases properly from the high lamp power to the rated lamp power to settle light emission stable, as is apparent from changes in the light amount of FIG. 19, the lamp voltage of FIG. 20, and the lamp current of FIG. 21. Note that, in the figure, Curve A designates a first mercury free lamp shown in FIGS. 2 and 3; Curve B a second mercury free lamp shown in FIGS. 4 and 5; and Curve C a third mercury free lamp shown in FIG. 6.

Figure 22:
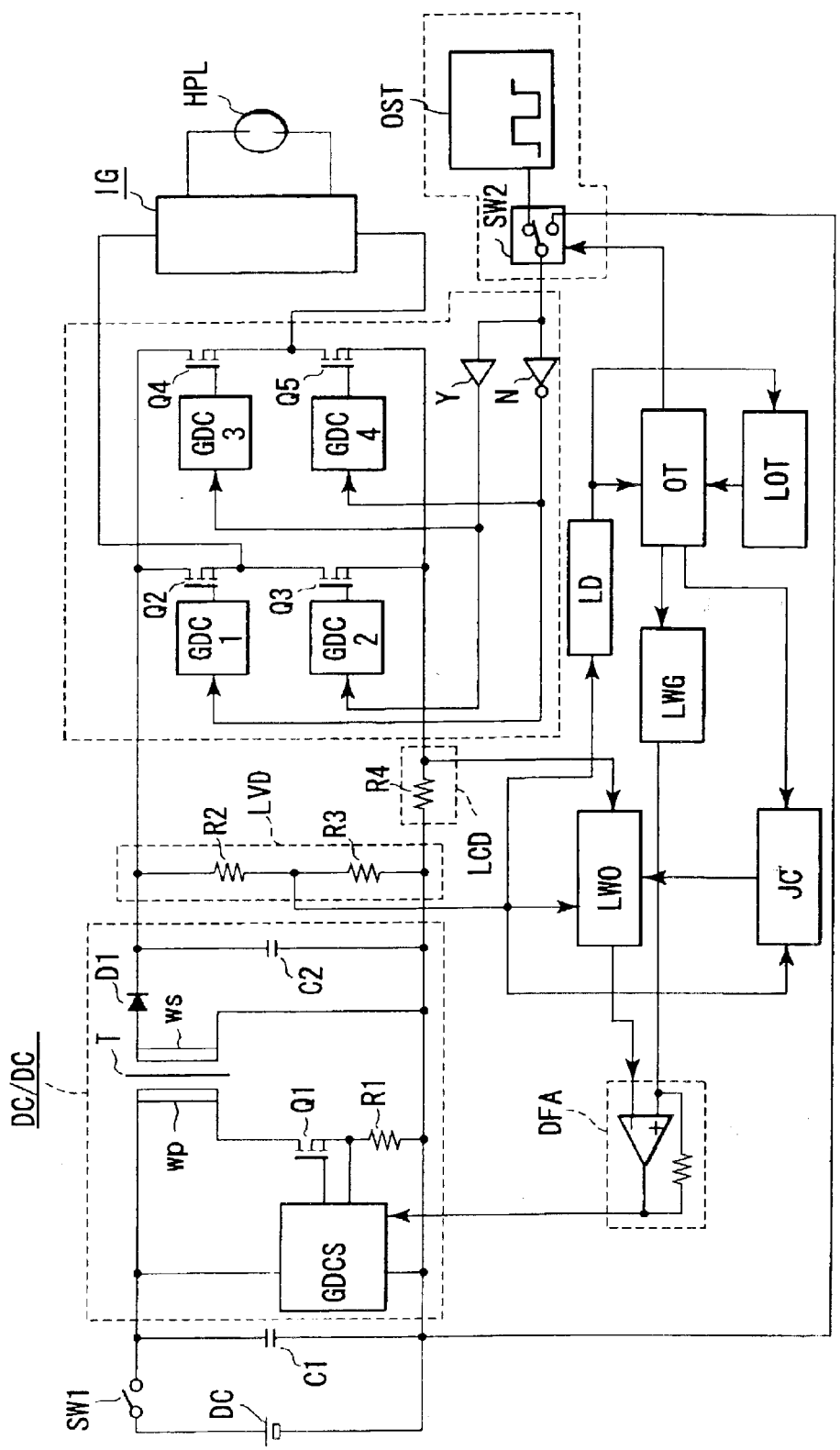
FIG. 22 is a circuit block diagram showing a fourth embodiment of the high pressure discharge lamp starter device of the present invention.

FIG. 22 is a circuit block diagram showing a fourth embodiment of the high pressure discharge lamp of the present invention. In the figure, like reference symbols are used to designate like structural elements in FIG. 15 and further explanation will be omitted for brevity's sake. In this embodiment, the judgment means JC directly controls the target lamp power arithmetic means LWG based on the output that lamp power may not be reduced, thereby returning the target lamp power to the value before reduction.

Figure 23:
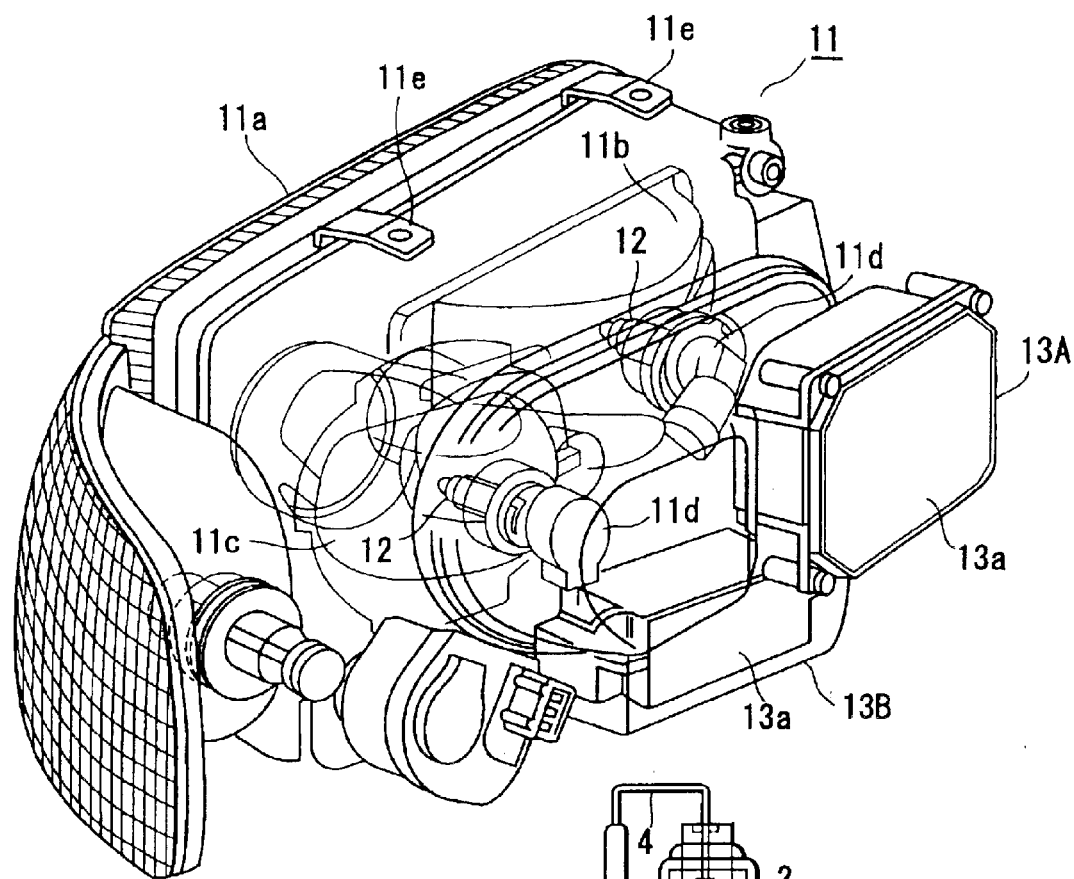
FIG. 23 is a perspective view of an embodiment of the automotive headlight device of the present invention.
Figure 24:
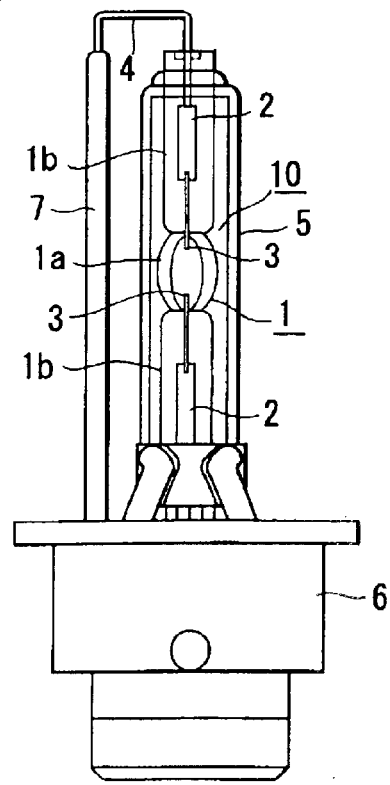
FIG. 24 is a front view of the high pressure discharge lamp.

Next, FIGS. 23 and 24 show an embodiment of an automotive headlight device of the present invention. FIG. 23 is a perspective view and FIG. 24 is a front view of a high pressure discharge lamp. In each of the figures, reference numeral 11 denotes a headlight device main body, 12 a high pressure discharge lamp, 13A and 13B high pressure discharge lamps.

The headlight main body 11 includes a front transparent panel 11a, reflectors 11b, 11c, and lamp socket 11d and attachment portion 11e. The front lens 11a is shaped so as to fit the outer surface of the automobile and has a predetermined optical means such as a prism. Reflectors 11b, 11c are arranged to each high pressure discharge lamp 12 and imparted with requisite light-emission characteristics. The lamp socket 11d is connected to the output end of the high pressure discharge lamp starter device and also connected to the base 12d of the high pressure discharge lamp 12. The attachment portion 11e is a means for fitting the headlight main body 11 to a predetermined position of the automobile.

The high pressure discharge lamp 12 includes a light-emission tube 12a, envelope tube 12b, lead line 12c and base 12d. The light emission tube 12a has the structure shown in FIG. 15 and one end of the tube is supported by the base 12d. The envelope tube 12b surrounds the light emission tube 12a. The lead line 12c is extended from the other end of the light-emission tube 12a and connected to the base along the light-emission tube 12a. Note that 12cI is an insulating tube. The base 12d is fixed to the reflectors 11b and 11c of the headlight main body 11 from the back surface. To the back surface of the base 12d, the lamp socket 11d is connected. In this manner, two high pressure discharge lamps 12 are fitted to the headlight device main body 11 to construct a quadruple high-pressure headlight device. The light emission portion of each high pressure discharge lamp 12 is placed at a focal point of the reflectors 11b and 11c of the headlight device main body 11.

The high pressure discharge lamp starter devices 13A, 13B each having a structure shown in FIG. 8 are housed in the metal container 13a and used for accelerating the high pressure discharge lamp 12 to turn on the lamp.

Since the high pressure discharge lamp starter device is capable of raising light flux quite normally from the startup to stable light emission time, it can stably emit light and free from environmental burden. The high pressure discharge lamp starter is applicable to an automotive headlight device.

What is claimed is:

1. A high pressure discharge lamp starter device comprising:
a starter circuit capable of starting up an essentially mercury free high pressure discharge lamp containing a rare gas and a metal halide; and
control means
which allows the starter circuit to start up the high pressure discharge lamp and to supply a lamp power larger than twice a rated lamp power; and
which controls the starter circuit to reduce the lamp power such that the light output is not significantly larger than that of a stable light-emission time and the light output does not rapidly increase, when a metal halide charged in the high pressure discharge lamp is abruptly vaporized;
and thereafter gradually reduce the lamp power so as to settle at the rated lamp power.

2. A high pressure discharge lamp starter device comprising
a starter circuit capable of starting up an essentially mercury free high pressure discharge lamp containing a rare gas and a metal halide; and
control means which controls the starter circuit to supply lamp power to the high pressure discharge lamp in such a manner that
a first lamp power larger than twice a rated lamp power is supplied during a first time zone,
a second lamp power is supplied during a second time zone, the second lamp power being reduced at a reduction rate of 1 to 8 W/second from the first lamp power, and
a third lamp power is supplied during a third time zone, the third lamp power being gradually reduced from the second lamp power to the rated lamp power,
where the first time zone is defined as the time of 1 to 20 seconds immediately after the startup of the high pressure discharge lamp;
the second time zone is defined as the time set within 0.4 to 9 seconds following the first time zone; and
the third time zone is defined as the time following the second time zone and within 40 to 70 seconds immediately after the startup.

3. The high pressure discharge lamp starter device according to claim 2, wherein the control means comprises
a target lamp power setup circuit which previously stores
the first target lamp power, which is larger than twice the rated lamp power of the high pressure discharge lamp, to be supplied in the first time zone,
the second target lamp power, which is reduced at a reduction rate of 1 to 8 W/second with the passage of time from the first target lamp power, to be supplied in the second time zone, and
the third target lamp power, which is gradually reduced from the second target lamp power to the rated lamp power, to be supplied in the third time zone;
a light-emission time measuring timer which measures the light-emission time of the high pressure discharge lamp and outputs a target lamp power from the target lamp power setting circuit in accordance with the light-emission time;
actual lamp power detection means which detects an actual lamp power supplied to the high pressure discharge lamp; and
lamp power regulation means which compares the target lamp power with the actual lamp power and regulates the actual lamp power in accordance with the difference between the target lamp power and the actual lamp power.

4. The high pressure discharge lamp starter device according to claim 3, wherein the control means comprises turn-on detection means which detects turn-on of the high pressure discharge lamp and initiates the emission time measuring timer to measure emission time when the turn-on is detected.

5. The high pressure discharge lamp starter device according to claim 1, wherein the control means comprises
a target lamp power setup circuit configured to store a first target lamp power, which is to be supplied in a first time zone and which is larger than twice a rated lamp power of the high pressure discharge lamp, and to store a second target lamp power, which is to be supplied in a second time zone, and which is gradually reduced from the first target lamp power with the passage of time, where the first time zone is defined from the startup to the time at which a metal halide charged in the high pressure discharge lamp abruptly vaporizes, and the second time zone is defined as the one continued from the first time zone and set within the range of 40 to 70 seconds immediately after the startup;

a light-emission time measuring timer which measures the time from the startup to turn-on of the high pressure discharge lamp;

halide abrupt vaporization detection means which detects the time at which the metal halide charged in the high pressure discharge lamp abruptly vaporizes after the startup; and turn-on detection means which detects the turn-on of the high pressure discharge lamp, the light emission time measuring timer working in concert with turn-on detection means and the halide abrupt vaporization detection means to allow the target lamp power setup circuit to output the first target lamp power when the turn-on detection means detects the turn-on of the high pressure discharge lamp;

to output the second target lamp power by switching the time zone to the second time zone, when the halide abrupt vaporization detection means detects the abrupt vaporization of a metal halide; and thereafter, to output target lamp power depending upon light emission time.

6. The high pressure discharge lamp starter device according to claim 5, wherein the halide abrupt vaporization detection means detects the abrupt vaporization of a halide by monitoring at least the voltage corresponding to the lamp voltage of the high pressure discharge lamp.

7. A high pressure discharge lamp starter device comprising:

a starter circuit capable of starting up an essentially mercury free high pressure discharge lamp containing a rare gas and a metal halide; and control means which allows the starter circuit to start up the high pressure discharge lamp and supply a lamp power larger than twice a rated lamp power which determines as to whether the lamp power should be gradually reduced or not; and which controls the starter circuit to gradually decrease the lamp power so as to settle the rated lamp power while almost continuously increasing lamp voltage.

8. A high pressure discharge lamp starter device comprising a starter circuit capable of starting up an essentially mercury free high pressure discharge lamp containing a rare gas and a metal halide; and control means which controls the starter circuit to start up the high pressure discharge lamp and supply a lamp power larger than twice a rated lamp power from the starter circuit, to determine as to whether the lamp power should be reduced or not based on the light emission state of the high pressure discharge lamp when the lamp power is reduced in the state that the light amount of the high pressure discharge lamp is smaller than that during the stable time, and to gradually reduce the lamp power so as to settle at the rated lamp power when it is determined that the lamp power should be decreased, or increase and return the lamp power to the level before the lamp power is reduced, when it is determined that the lamp power should not be reduced.

9. The high pressure discharge lamp starter device according to claim 8, wherein the determination as to whether the lamp power should be reduced or not is made based on an increase or decrease of the lamp voltage.

10. The high pressure discharge lamp starter device according to any one of claims 1 to 9, further comprising an essentially mercury free high pressure discharge lamp containing a rare gas and a metal halide.

11. An automotive headlight device comprises an automotive headlight device main body and the high pressure discharge lamp starter device according to claim 10 arranged in the automotive headlight device main body.

* * * * *